(12) United States Patent
Smith et al.

(10) Patent No.: US 11,994,907 B1
(45) Date of Patent: May 28, 2024

(54) HEAD MOUNTED DEVICE

(71) Applicants: Samuel G. Smith, San Francisco, CA
(US); Jae Hwang Lee, Los Gatos, CA
(US); David A. Kalinowski, San
Francisco, CA (US); Claire E. Dalke,
San Francisco, CA (US)

(72) Inventors: Samuel G. Smith, San Francisco, CA
(US); Jae Hwang Lee, Los Gatos, CA
(US); David A. Kalinowski, San
Francisco, CA (US); Claire E. Dalke,
San Francisco, CA (US)

( * ) Notice: Subject to any disclaimer, the term of this
patent is extended or adjusted under 35
U.S.C. 154(b) by 424 days.

(21) Appl. No.: 17/408,672

(22) Filed: Aug. 23, 2021

Related U.S. Application Data

(63) Continuation of application No. 16/509,560, filed on Jul. 12, 2019, now Pat. No. 11,150,695.

(60) Provisional application No. 62/729,551, filed on Sep. 11, 2018.

(51) Int. Cl.
G02B 7/02 (2021.01)
G06F 1/16 (2006.01)

(52) U.S. Cl.
CPC .............. G06F 1/163 (2013.01); G02B 7/021 (2013.01)

(58) Field of Classification Search
CPC ............ G02B 27/0176; G02B 27/0178; G02B 27/017; G06F 1/163; G06F 3/011
See application file for complete search history.

(56) References Cited

U.S. PATENT DOCUMENTS

| 9,810,911 | B2 | 11/2017 | Miller et al. |
| 10,071,307 | B1 | 9/2018 | Castelli |
| 11,036,054 | B2 | 6/2021 | Poore et al. |
| 11,204,505 | B2 * | 12/2021 | Terashima ............. G02C 5/001 |
| 2017/0277254 | A1 | 9/2017 | Osman |
| 2018/0046147 | A1 | 2/2018 | Aghara et al. |
| 2018/0059776 | A1 | 3/2018 | Jiang et al. |
| 2018/0095497 | A1 | 4/2018 | Hsu et al. |
| 2018/0214080 | A1 | 8/2018 | Peeters et al. |
| 2019/0072772 | A1 | 3/2019 | Poore et al. |
| 2019/0346682 | A1 | 11/2019 | Kang et al. |
| 2020/0280801 | A1 | 9/2020 | Andersen et al. |
| 2021/0007895 | A1 | 1/2021 | Gustafsson |
| 2021/0068277 | A1 | 3/2021 | Mulliken et al. |

FOREIGN PATENT DOCUMENTS

| CN | 105204165 A | 12/2015 |
| CN | 106054391 A | 10/2016 |
| CN | 205982829 U | 2/2017 |
| CN | 206213483 U | 6/2017 |
| CN | 107179609 A | 9/2017 |
| CN | 206960781 U | 2/2018 |

* cited by examiner

*Primary Examiner* — Corey N Skurdal
(74) *Attorney, Agent, or Firm* — Young Basile Hanlon & MacFarlane, P.C.

(57) ABSTRACT

A head mounted device includes a housing, lenses connected to the housing, and a lens cover that is connected to the housing and is movable between a connected position and a disconnected position with respect to the housing.

20 Claims, 19 Drawing Sheets

HEAD MOUNTED DEVICE

CROSS-REFERENCE TO RELATED APPLICATIONS

This application is a continuation of United States patent application. Ser. No. 16/509,560, filed on Jul. 12, 2019, which claims the benefit of U.S. Provisional Application No. 62/729,551 filed on Sep. 11, 2018, the contents of which is hereby incorporated by reference herein in its entirety for all purposes.

TECHNICAL FIELD

This disclosure relates generally to head mounted devices that are configured to display content to a user.

BACKGROUND

Virtual reality systems, augmented reality systems, and mixed reality systems often include a head mounted device that displays content to a user. The head mounted device may include a housing that is worn on the user's head and is supported by a flexible support or a rigid support. Head mounted devices of this type typically require some manner of adjustment to fit the user's head. Incorrect size adjustments can result in user discomfort and instability of the device relative to the user's head. Manual adjustment may also be time consuming and inconvenient.

SUMMARY

One aspect of the disclosure is a head mounted device that includes a housing that defines an interior space and an elongate member that is connected to the housing and is configured to expand and contract to conform to the head of a user. The elongate member includes at least one end portion that is connected to the housing at an attachment point. The attachment point is located in the interior space of the housing such that the end portion of the elongate member extends along a path within the housing that has a length that is greater than half of a lateral width of the housing.

Another aspect of the disclosure is a head mounted device that includes a housing that defines an interior space and an elongate member control mechanism that is coupled to the interior space of the housing. The head mounted device may include an elongate member that is coupled to the elongate member control mechanism and is configured to extend circumferentially around the head of a user, where the elongate member control mechanism is operable to extend and retract the elongate member. The head mounted device may include an elongate member retaining mechanism that is located in the housing and is operable to engage the elongate member to restrain extension and retraction of the elongate member.

Another aspect of the disclosure is a head mounted device that includes a housing that defines an interior space and an elongate member control mechanism that is coupled to the interior space of the housing. The head mounted device may include an elongate member that is coupled to the elongate member control mechanism and configured to extend circumferentially around the head of a user, where the elongate member control mechanism is operable to extend and retract the elongate member. The head mounted device may include lenses coupled to the housing. The elongate member may include a lens cover having at least one connector configured to removably connect to the housing. The lens cover is moveable relative to the housing between a connected position and a disconnected position.

Another aspect of the disclosure is a head mounted device that includes a housing and a first elongate member that is connected to the housing and is configured to extend around a first portion of the head of a user. The head mounted device may include a first magnetic connector that is connected to the first elongate member, and the head mounted device may include a second magnetic connector. The first magnetic connector and the second magnetic connector are movable between a connected position, in which the first elongate member is configured to secure the housing with respect to the head of a user, and a disconnected position, in which the first elongate member is configured to release the housing with respect to the head of the user.

Another aspect of the disclosure is a method for correcting orientation of a head mounted device. The method includes detecting motion of a display enclosure using a first motion sensing device, detecting motion of an elongate member using a second motion sensing device, determining whether a position of the display enclosure changes relative to the elongate member based on the detected motion of the display enclosure and the detected motion of the elongate member, and, in response to a determination that a position of the display enclosure has changed relative to the elongate member, applying a correction to the display enclosure.

DETAILED DESCRIPTION

The devices and methods herein allow for simplified adjustment of a head mounted device that includes a housing and an elongate member disposed around the head of a user. By disposing a portion of the elongate member in an interior space of the housing and connecting the elongate member to the housing using elastic, sprung, electrical, and/or mechanical elements, the elongate member can be extended out of the housing and around the head of the user such that the elongate member automatically adjusts to the size of the user's head. As a result, adjustment of the head mounted device is simplified, the length of time required to begin using the device is shortened, user comfort is increased, the stability of the head mounted device relative to the user's head is improved, and an ideal fit can be achieved for all users regardless of variations in user head size.

Figure 1:
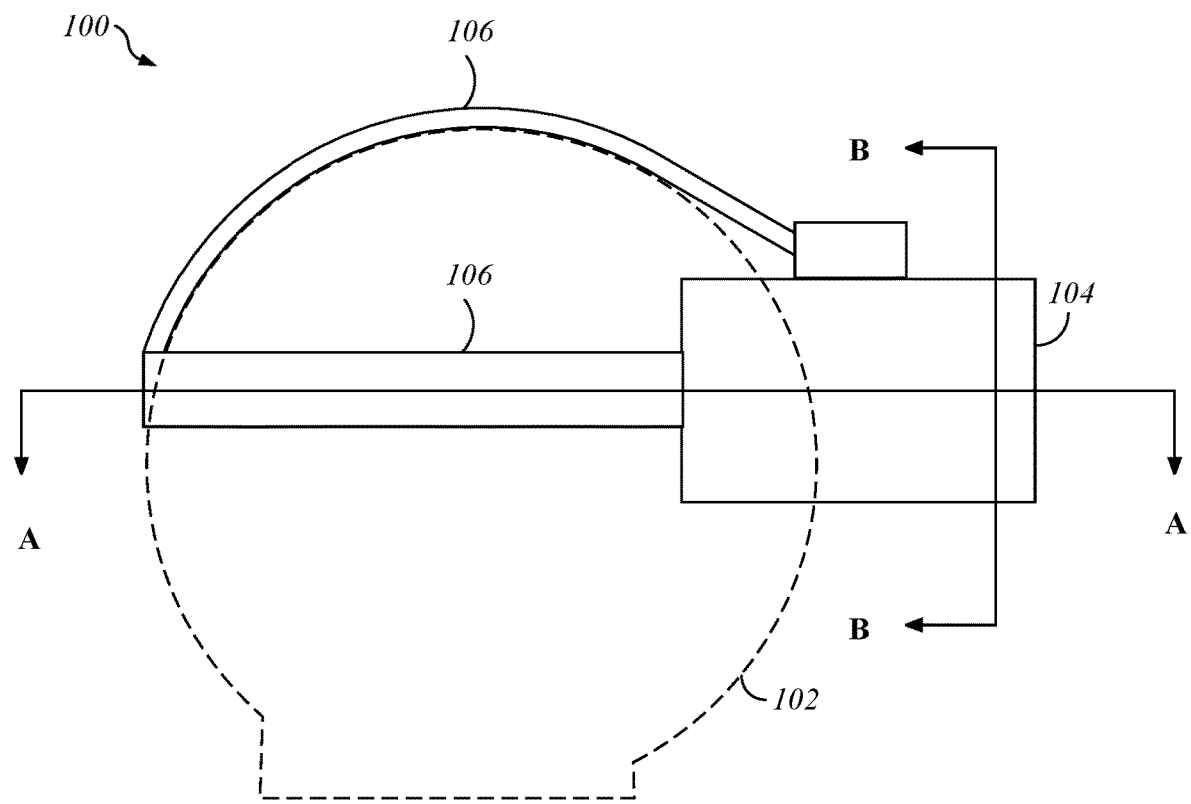
FIG. 1 is a side view of a head mounted device according to a first example.

FIG. 1 is a side view of a head mounted device 100 worn by a user. The head mounted device 100 may be worn on the head 102 of the user and may allow the user to view images or other content using a display. The content may be part of an immersive experience in which the content appears to replace, supplement, or change the environment around the user. In the examples that are shown and described herein, the head mounted device 100 is configured to display virtual reality content to the user. For example, the head mounted device 100 may be configured to display the virtual reality content to the user in correspondence with tracked motion of the head 102 of the user, and such that the virtual reality content is displayed to the user to the exclusion of the environment around the user. The configurations described herein can be utilized with head mounted devices that are configured to display other types of content such as augmented reality content and mixed reality content.

In the illustrated example, the head mounted device 100 includes a housing 104 and an elongate member 106 (e.g., a headband). The housing 104 provides a structure to which other components of the head mounted device 100 may connect. The housing 104 may be shaped so as to be worn on the user's head 102 and/or face and may be selectively positioned to be near the user's eyes. The housing 104 is removably, permanently, or semi permanently connected to at least a portion of the elongate member 106, which may be referred to as a strap or headband.

The elongate member 106 supports, positions, and/or secures the housing 104 to the user's head 102. The elongate member 106 may be adjusted between an extended position in which the elongate member 106 may be extended around the head 102 of the user and a retracted position. As an example, the elongate member 106 may be in the extended position when the head mounted device 100 is being used, and the elongate member 106 may be in the retracted position when the head mounted device 100 is not being used.

As shown in FIG. 1, the elongate member 106 supports the head mounted device 100 relative to the head 102 of the user in a goggles-style configuration in which the elongate member 106 is connected to the lateral sides of the housing 104 and extends around the head 102 of the user. In alternative implementations, the head mounted device 100 may be supported with respect to the user's head 102 using a halo-style configuration in which a support plate contacts the user's forehead and the elongate member 106 secures the support plate to the head 102 of the user, or using any other suitable configuration.

In the examples described herein, the elongate member 106 may be or include a strap or headband formed from an elastic material, such as nylon or another suitable material. In the examples described herein, the elongate member 106 may be or include a cord formed from an elastic material, such as nylon or another suitable material. In some implementations, the elongate member 106 includes both strap portions and cord portions. In some implementations, other types of structures are included in the elongate member 106. In some implementations, the elongate member 106 may include inelastic structures in addition to elastic structures.

Figure 2:
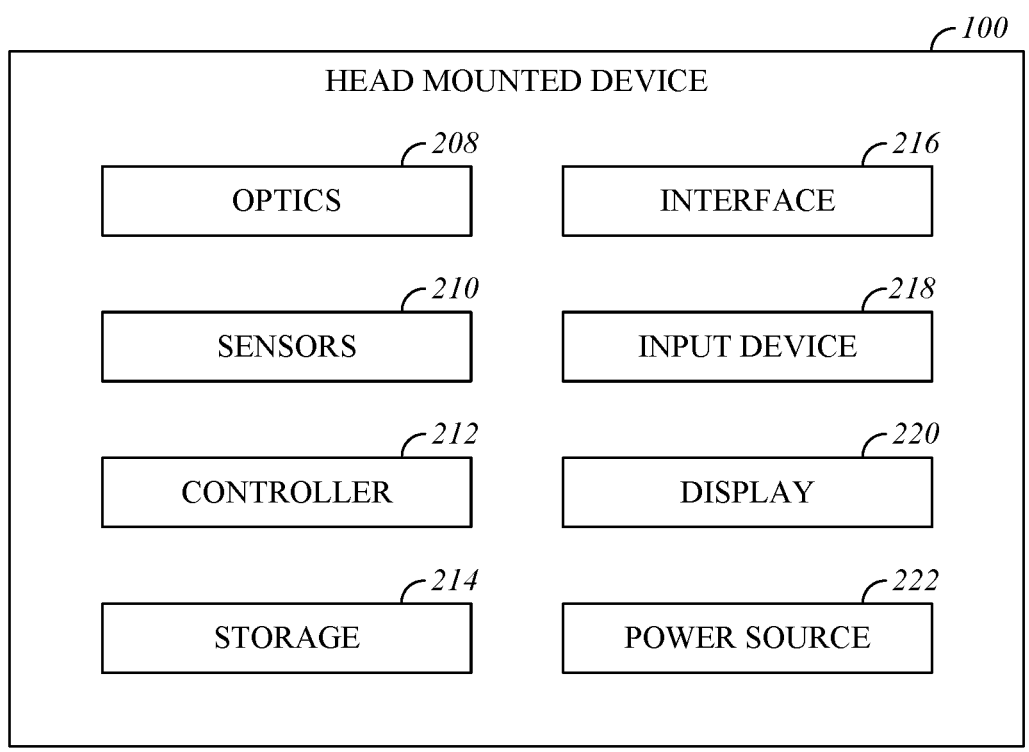
FIG. 2 is a block diagram of components that can be included in the head mounted device according to the first example.

FIG. 2 is a block diagram of components that can be included in the head mounted device 100. The head mounted device 100 may include features similar to those of the head mounted device 100. The head mounted device 100 may include components connected to or retained in the housing 104. Such components may include, but are not limited to, optics 208, sensors 210, a controller 212 including a memory and a processor, storage 214, an interface 216, an input device 218, a display 220, and a power source 222. The components connected to or retained in the housing 104 may be connected to an external device that is removably connected to the housing 104.

The optics 208 may guide light that is emitted by the display 220 to the user's eyes to allow content to be presented to the user. The optics 208 may include lenses or other suitable components.

The sensors 210 may be located in the housing 104 or may be otherwise incorporated into the head mounted device 100. The sensors 210 are adapted to output signals that represent or are indicative of a sensed condition. The sensors 210 may include visible spectrum cameras; infrared spectrum cameras; structured-light stereo devices; depth cameras; an inertial measuring unit including accelerometers, gyroscopes, and magnetometers; lidar devices; radar devices; ultrasonic devices; infrared detectors; infrared beacons that emit signals that can be measured by external infrared detectors; capacitance sensors; biometric sensors; temperature sensors; light sensors; pressure sensors; force sensors; or any other type of sensor. The signals that are generated by the sensors 210 may be used during generation of the content that is presented to the user, such as by determining a head-tracking angle using the sensors 210 and generating content dependent on the head-tracking angle.

The controller 212 may include a processor and a memory. The controller 212 may be located in the housing 104 or may be otherwise incorporated into the head mounted device 100. The controller 212 may be in electrical communication with any described component. The processor is operable to execute machine-readable instructions that may be stored in the memory or the storage 214. The processor may be a central processing unit or any other conventional device. The memory may be a random-access memory module or any other high-speed, volatile, short-term information storage device. The storage 214 may include a solid-state drive, hard drive, or any other non-volatile information storage device.

The interface 216 allows the head mounted device 100 to communicate with external devices. The interface 216 may include a wired connection or a wireless connection that is implemented using any suitable communications protocol.

The input device 218 may include manual buttons, switches, analog sticks, directional pads, or the like; a handheld motion-tracked controller; a touchscreen input device; a gestural input device; or an audio input device such as a microphone.

The display 220 is operable to output images including still images and video images. The display 220 may include an LED screen, an LCD screen, or an OLED screen. The display 220 may be integral with the housing 104 or may be included in an external device that is removably connected to the housing 104.

The power source 222 supplies electrical power to the head mounted device 100. The power source 222 may include a battery, such as a rechargeable battery or a non-rechargeable battery of any suitable type.

The general configuration of the head mounted device 100, as described with respect to FIGS. 1-2, is generally applicable to head mounted devices according to second through nineteenth examples that will be described herein and is hereby incorporated by reference in the descriptions of those devices.

Figure 3:
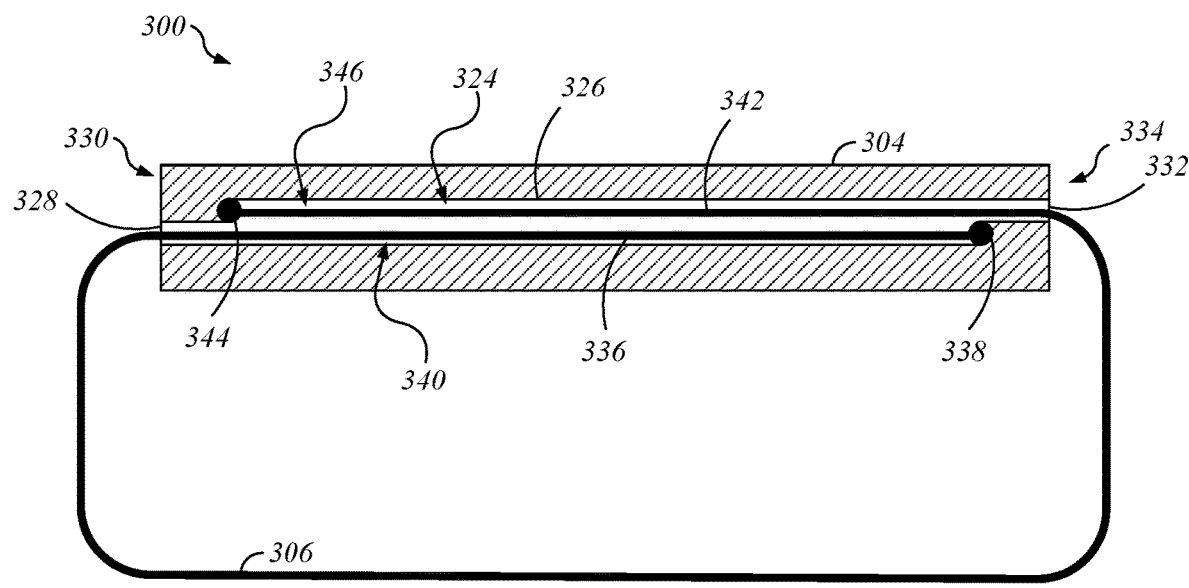
FIG. 3 is a top cross-sectional view taken along line A-A of FIG. 1 of a head mounted device according to a second example.

FIG. 3 is a top cross-sectional view taken along line A-A of FIG. 1 of a head mounted device 300 according to a second example. The head mounted device 300 may include features similar to those of the head mounted device 100 except as otherwise described. In the illustrated example, the head mounted device 300 includes a housing 304 and an elongate member 306. The elongate member 306 is connected to the housing 304 such that it is movable with respect to the housing 304 between a retracted position, in which at least a portion of the elongate member 306 is stored within the housing 304, and an extended position. As an example, twenty-five percent or more of the elongate member 306 may be stored in the housing 304 in the retracted position.

The housing 304 has an interior space 324 that defines a passage 326. As used herein, the term "passage" refers to a partially or fully enclosed area within the housing 304 through which the elongate member 306 may pass. The passage 326 extends from a first opening 328 at a first lateral side 330 of the housing 304 to a second opening 332 at a second lateral side 334 of the housing 304. In the illustrated example, the passage 326 extends laterally across the housing 304 from the first lateral side 330 to the second lateral side 334 and is generally straight. The passage 326 may, however, be configured differently. As examples, the passage 326 may be straight, may be curved, may define a serpentine configuration, or may be configured according to any other shape. While the interior space 324 in the illustrated example defines a passage, it may additionally or alternatively define an opening, recess, cavity, depression, enclosure, and/or other interior space.

The elongate member 306 is a flexible, elastic structure, such as a strap, a cord, a strap and cord in combination, or any other suitable flexible, elastic structure. The elongate member 306 includes a first end portion 336 and a second end portion 342. Although the elongate member 306 is flexible and elastic, components and structures incorporated in or attached to the elongate member 306 may be inflexible and/or inelastic.

The first end portion 336 is a part of the elongate member 306 that is located inside the housing 304, inclusive of the location at which the elongate member 306 terminates. The first end portion 336 is connected to the housing 304 at a first attachment point 338. The first end portion 336 extends along a first path 340 through the passage 326 from the first attachment point 338 to the first opening 328. As used herein, the term "first path" is defined as the path along which a first part of the elongate member 306 extends, such as from the first attachment point 338 to the first opening 328 in this example. The first attachment point 338 is located in the interior space 324 at a position that is near the second lateral side 334. The first end portion 336 may be connected to the housing 304 at the first attachment point 338 using any type of adhesive, magnets, stitching, hook-and-loop fasteners, welding, rivets, interference fit, snaps, fastener, or any other type of attachment.

To allow storage of part of the elongate member 306 in the housing 304 in the retracted position, the first path 340 has a length that is greater than half of a lateral width of the housing 304. In some implementations, the first path 340 may extend along any lateral width of the housing 304.

The second end portion 342 is located at an opposite end of the elongate member 306 relative to the first end portion 336. The second end portion 342 may or may not be the same length as the first end portion 336.

The second end portion 342 is a part of the elongate member 306 that is located inside the housing 304, inclusive of the location at which the elongate member 306 terminates. The second end portion 342 is connected to the housing 304 at a second attachment point 344. The second end portion 342 extends along a second path 346 through the passage 326 from the second attachment point 344 to the second opening 332. As used herein, the term "second path" is defined as the path along which a second part of the elongate member 306 extends, such as from the second attachment point 344 to the second opening 332 in this example. The second attachment point 344 is located in the interior space 324 at a position that is near the first lateral side 330. The second end portion 342 may be connected to the housing 304 at the second attachment point 344 using any type of adhesive, magnets, stitching, hook-and-loop fasteners, welding, rivets, interference fit, snaps, fastener, or any other type of attachment.

To allow storage of part of the elongate member 306 in the housing 304 in the retracted position, the second path 346 has a length that is greater than half of a lateral width of the housing 304. In some implementations, the second path 346 may extend along any lateral width of the housing 304.

The length of the first end portion 336 and the second end portion 342 inside the interior space 324 may change when the elongate member 306 is adjusted between the retracted position and the extended position, as a result of elastic expansion and contraction of the elongate member 306. The elongate member 306 may be adjusted to the extended position when the elongate member 306 is disposed around the head of the user. In the extended position, part of the first end portion 336 and/or part of the second end portion 342 elastically extend from inside the interior space 324 to an exterior of the housing 304. The elongate member 306 may return to the retracted position if the elongate member 306 is removed from the head of the user. In the retracted position, part of the first end portion 336 and part of the second end portion 342 elastically retract into the interior space 324. More of the elongate member 306 may be stored in the interior space 324 in the retracted position than in the extended position. As a result of the storage of portions of the elongate member 306 in the housing 304, the effective working length (i.e., length that is available to expand and contract) of the elongate member 306 is greater than the length that is disposed outside of the housing 304 in the retracted position. This allows a smaller minimum head size to be accommodated by the elongate member 306, while still allowing expansion for large head sizes as a part of the elongate member 306 that is inside the housing 304 lengthens elastically and exits the housing 304 during movement toward the expanded position (i.e., that position at which a maximum head size is accommodated by the elongate member 306).

Figure 4:
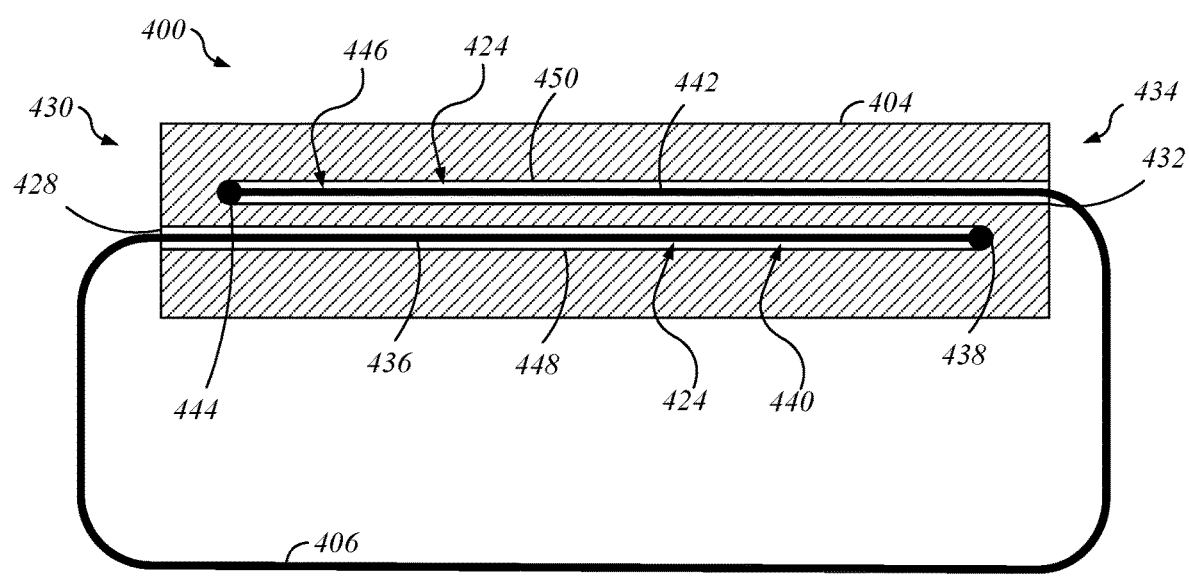
FIG. 4 is a top cross-sectional view taken along line A-A of FIG. 1 of a head mounted device according to a third example.

FIG. 4 is a top cross-sectional view taken along line A-A of FIG. 1 of a head mounted device 400 according to a third example. The head mounted device 400 may include features similar to those of the head mounted device 300 except as otherwise described. In the illustrated example, the head mounted device 400 includes a housing 404 and an elongate member 406.

The housing 404 has an interior space 424 that defines a first passage 448 and a second passage 450. The first passage 448 extends laterally across the housing 404 from a first opening 428 to a first attachment point 438 that is located in the first passage 448 at a position that is near a second lateral side 434 of the housing 404. The second passage 450 extends laterally from a second opening 432 to a second attachment point 444 that is located in the second passage 450 at a position that is near a first lateral side 430 of the housing 404. The first passage 448 and the second passage 450 shown in the illustrated example are generally straight. The first passage 448 and the second passage 450 may, however, be configured differently. As examples, the first passage 448 and the second passage 450 may be straight, may be curved, may define a serpentine configuration, or may be configured according to any other shape. The first passage 448 and the second passage 450 may or may not be the same shape.

In the illustrated example, a first end portion 436 of the elongate member 406 extends from the first attachment point 438, along a first path 440 through the first passage 448, and to the first opening 428. A second end portion 442 extends from the second attachment point 444, along a second path 446 through the second passage 450, and to the second opening 432.

Figure 5:
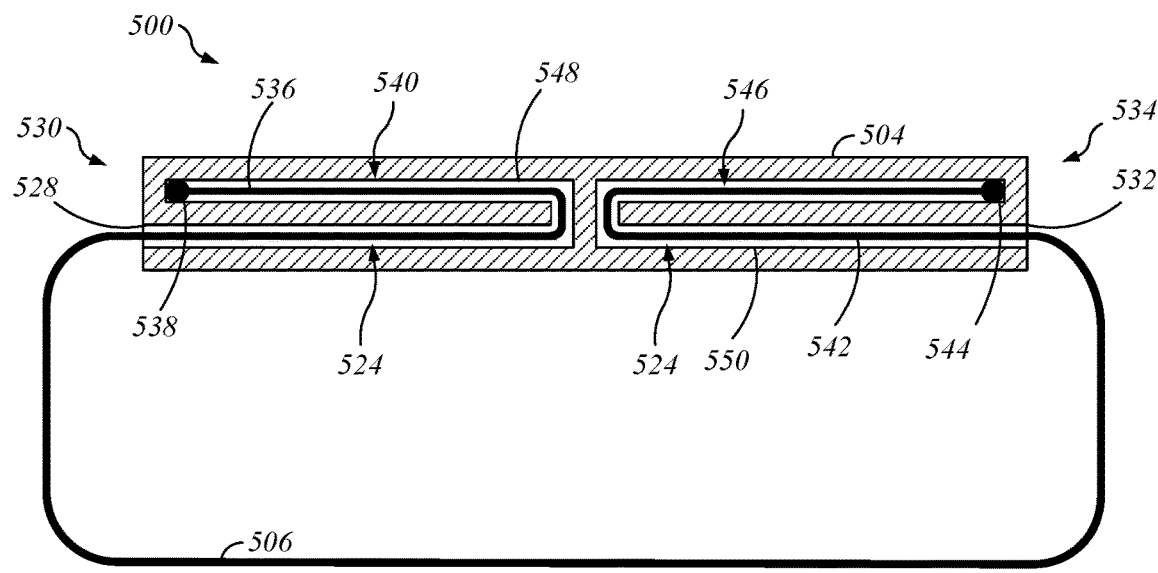
FIG. 5 is a top cross-sectional view taken along line A-A of FIG. 1 of a head mounted device according to a fourth example.

FIG. 5 is a top cross-sectional view taken along line A-A of FIG. 1 of a head mounted device 500 according to a fourth example. The head mounted device 500 may include features similar to those of the head mounted device 400 except as otherwise described. In the illustrated example, the head mounted device 500 includes a housing 504 and an elongate member 506. The housing 504 has an interior space 524 that defines a first passage 548 and a second passage 550. The first passage 548 extends in a U-shape from a first opening 528 to a first attachment point 538. The first attachment point 538 is located in the first passage 548 at a position that is near a first lateral side 530 of the housing 504. The second passage 550 extends in a U-shape from a second opening 532 to a second attachment point 544. The second attachment point 544 is located in the second passage 550 at a position that is near a second lateral side 534 of the housing 504. The first passage 548 and the second passage 550 are generally U-shaped. The first passage 548 and the second passage 550 may, however, be configured differently. As examples, the first passage 548 and the second passage 550 may be straight, may be curved, may define a serpentine configuration, or may be configured according to any other shape. The first passage 548 and the second passage 550 may or may not be the same shape and may include any number of bends, curves, or turns.

In the illustrated example, a first end portion 536 of the elongate member 506 extends from the first attachment point 538, along a first path 540 through the first passage 548, and to the first opening 528. A second end portion 542 extends from the second attachment point 544, along a second path 546 through the second passage 550, and to the second opening 532.

Figure 6:
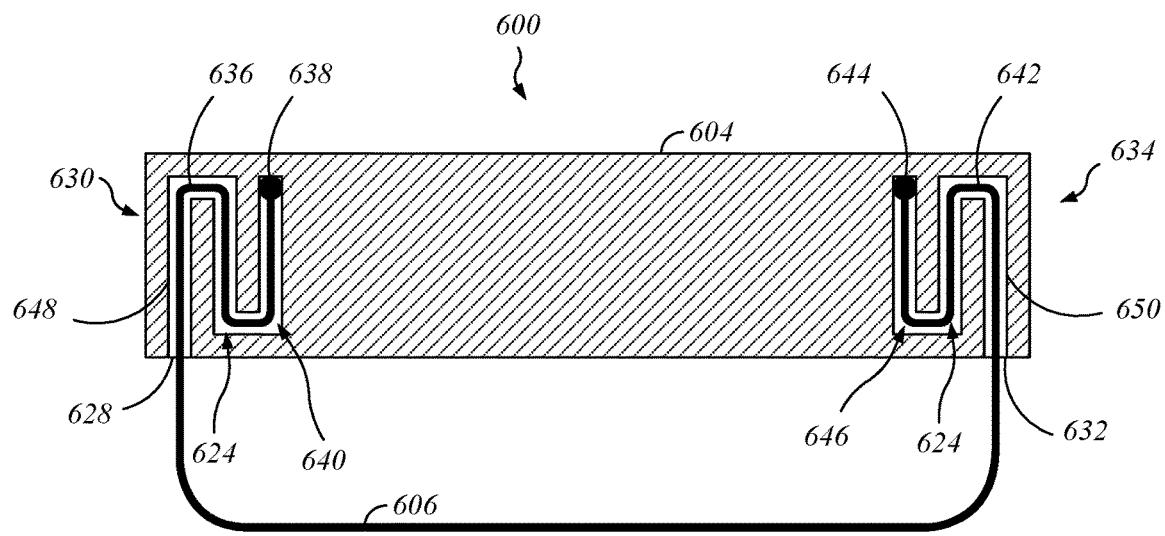
FIG. 6 is a top cross-sectional view taken along line A-A of FIG. 1 of a head mounted device according to a fifth example.

FIG. 6 is a top cross-sectional view taken along line A-A of FIG. 1 of a head mounted device 600 according to a fifth example. The head mounted device 600 may include features similar to those of the head mounted device 500 except as otherwise described.

In the illustrated example, the head mounted device 600 includes a housing 604 and an elongate member 606. The housing 604 has an interior space 624 that defines a first passage 648 and a second passage 650. The first passage 648 extends in a serpentine shape from a first opening 628 to a first attachment point 638. The first attachment point 638 is located in the first passage 648 at a position that is between a first lateral side 630 of the housing 604 and a lateral center of the housing 604. The second passage 650 extends in a serpentine shape from a second opening 632 to a second attachment point 644. The second attachment point 644 is located in the second passage 650 at a position that is between a second lateral side 634 of the housing 604 and a lateral center of the housing 604. In some embodiments, the first attachment point 638 may be disposed at any distance from the first lateral side 630. The second attachment point 644 may be disposed at any distance from the second lateral side 634. The first passage 648 and the second passage 650 are generally serpentine shaped. The first passage 648 and the second passage 650 may, however, be configured differently. As examples, the first passage 648 and the second passage 650 may have any shape and/or may include any number of curves, bends, turns, spirals, or switchbacks in any configuration and/or orientation. The first passage 648 and the second passage 650 may or may not be the same shape.

In the illustrated example, a first end portion 636 of the elongate member 606 extends from the first attachment point 638, along a first path 640 through the first passage 648, and to the first opening 628. A second end portion 642 extends from the second attachment point 644, along a second path 646 through the second passage 650, and to the second opening 632.

Figure 7:
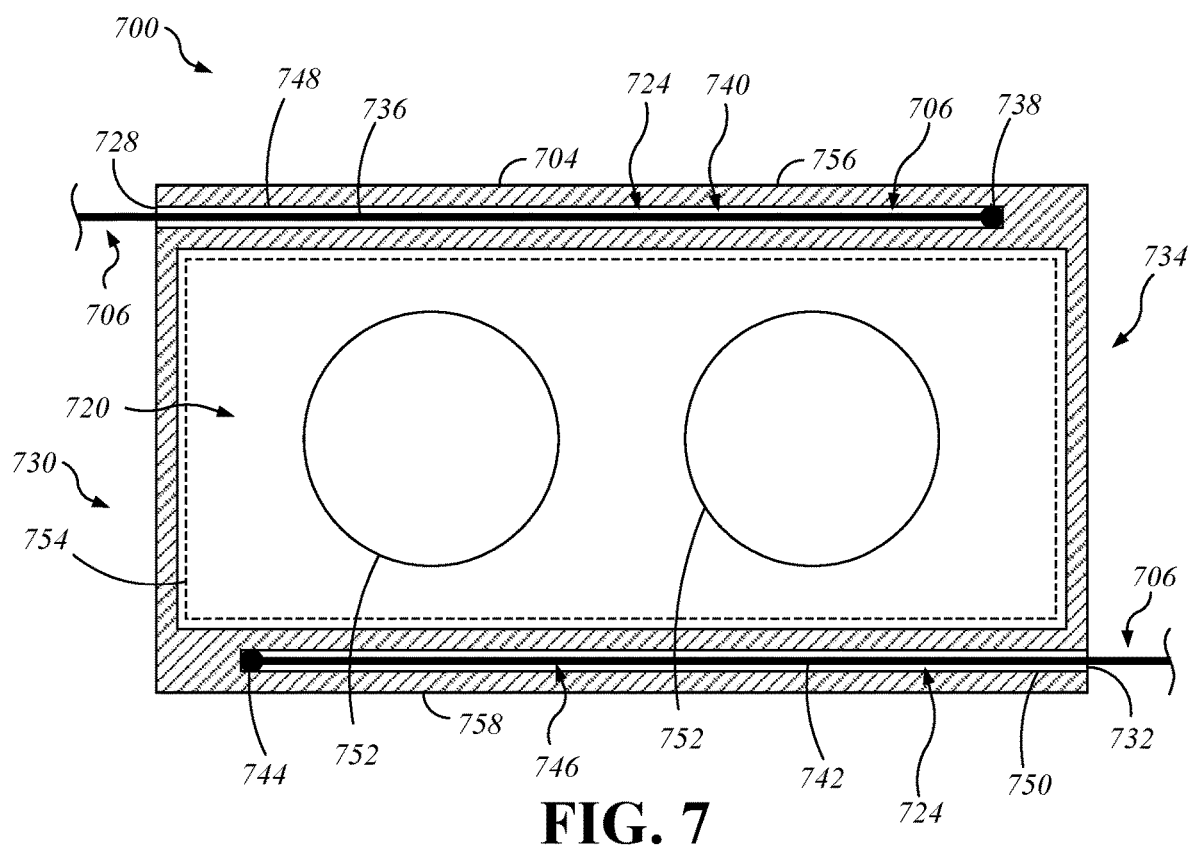
FIG. 7 is a front cross-sectional view taken along line B-B of FIG. 1 of a head mounted device according to a sixth example.

FIG. 7 is a front cross-sectional view taken along line B-B of FIG. 1 of a head mounted device 700 according to a sixth example. The head mounted device 700 may include features similar to those of the head mounted device 400 except as otherwise described. The head mounted device 700 may include lenses 752 and components 754. In the illustrated example, the two lenses 752 are connected to the housing 704. The lenses 752 may include one unitary lens or multiple lenses. Content from a display 720 may be viewed by the user through the lenses 752. The components 754 are connected to any portion of the housing 704. The components 754 may include any described components or devices supported by the housing 704, including those previously described.

In the illustrated example, the head mounted device 700 includes a housing 704 and an elongate member 706. The housing 704 has an interior space 724 that defines a first passage 748 and a second passage 750. The first passage 748 extends laterally along a top side 756 of the housing 704 above the lenses 752 and components 754 from a first opening 728 to a first attachment point 738. The first attachment point 738 is located in the first passage 748 at a position that is near a second lateral side 734 of the housing 704. The second passage 750 extends laterally along a bottom side 758 of the housing 704 below the lenses 752 and components 754 from a second opening 732 to a second attachment point 744. The second attachment point 744 is located in the second passage 750 at a position that is near a first lateral side 730 of the housing 704. The first passage 748 and the second passage 750 are generally straight. The first passage 748 and the second passage 750 may, however, be configured differently. As examples, the first passage 748 and the second passage 750 may be straight, may be curved, may define a serpentine configuration, or may be configured according to any other shape. The first passage 748 and the second passage 750 may or may not be the same shape.

In the illustrated example, a first end portion 736 of the elongate member 706 extends from the first attachment point 738, along a first path 740 through the first passage 748, and to the first opening 728. A second end portion 742 extends from the second attachment point 744, along a second path 746 through the second passage 750, and to the second opening 732.

In some embodiments, the first passage 748 may extend along the bottom side 758 of the housing 704, and the second passage 750 may extend along the top side 756 of the housing 704. In some embodiments, both the first passage 748 and the second passage 750 may extend along the top side 756 of the housing 704 or the bottom side 758 of the housing 704. The interior space 724 of the housing 704 may also define one passage extending along the top side 756 of the housing 704 or the bottom side 758 of the housing 704, through which both the first end portion 736 and the second end portion 742 extend.

Figure 8:
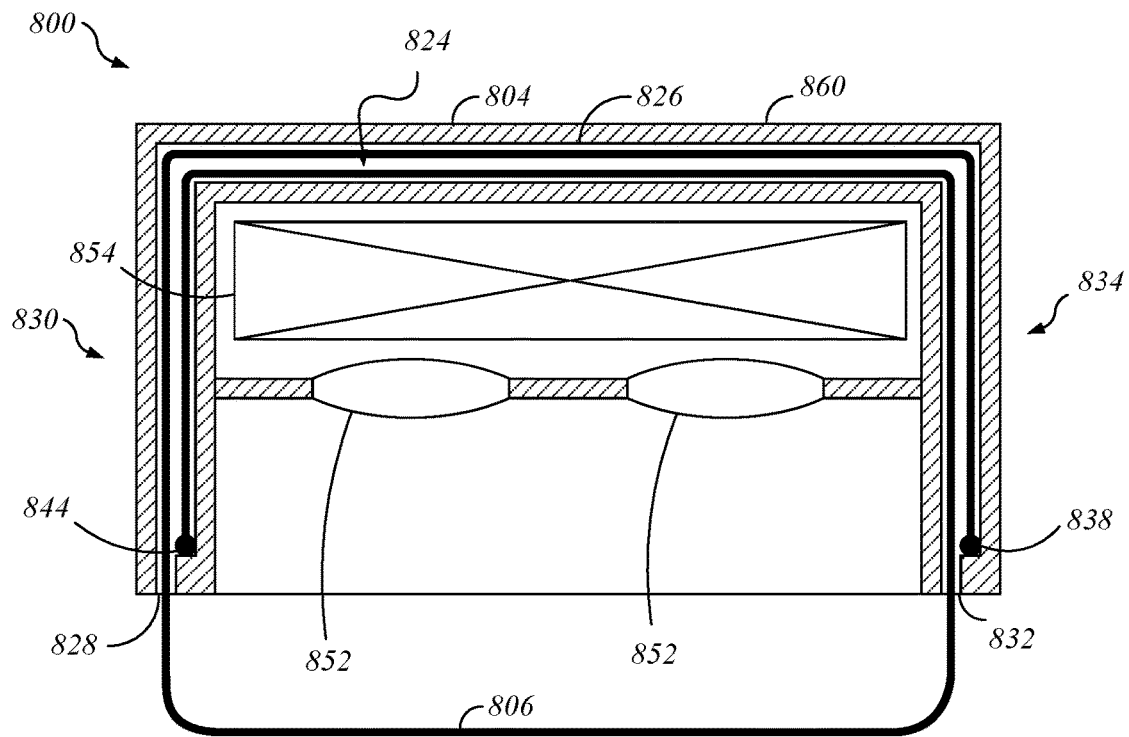
FIG. 8 is a top cross-sectional view taken along line A-A of FIG. 1 of a head mounted device according to a seventh example.

FIG. 8 is a top cross-sectional view taken along line A-A of FIG. 1 of a head mounted device 800 according to a seventh example. The head mounted device 800 may include features similar to those of the head mounted device 300 except as otherwise described. In the illustrated example, the head mounted device 800 includes a housing 804 and an elongate member 806. The housing 804 has an interior space 824 that defines a passage 826. The passage 826 extends from a first opening 828, around a periphery of the housing 804 and around the lenses 852 and the components 854, and to a second opening 832. In the illustrated example, the passage 826 extends along a first lateral side 830, a front side 860, and a second lateral side 834 of the housing 804. The first attachment point 838 is disposed near the second opening 832. The second attachment point 844 is disposed near the first opening 828. In some embodiments, the first attachment point 838 and the second attachment point 844 may be disposed anywhere on the housing 804.

In the illustrated example, a first portion of the elongate member 806 extends through the passage 826 from the first opening 828 to the first attachment point 838, and a second portion of the elongate member 806 extends through the passage 826 from the second opening 832 to the second attachment point 844. Thus, the first and second portions of the elongate member 806 extend through a common passage in the illustrated example. In alternative implementations, the interior space 824 of the housing 804 may define a first passage that extends around the periphery of the housing 804 and around the lenses 852 and the components 854, and along which the elongate member 806 may extend from the first opening 828 to the first attachment point 838, as well as a second passage that extends around the periphery of the housing 804 and around the lenses 852 and the components 854, and along which the elongate member 806 may extend from the second opening 832 to the second attachment point 844.

Figure 9:
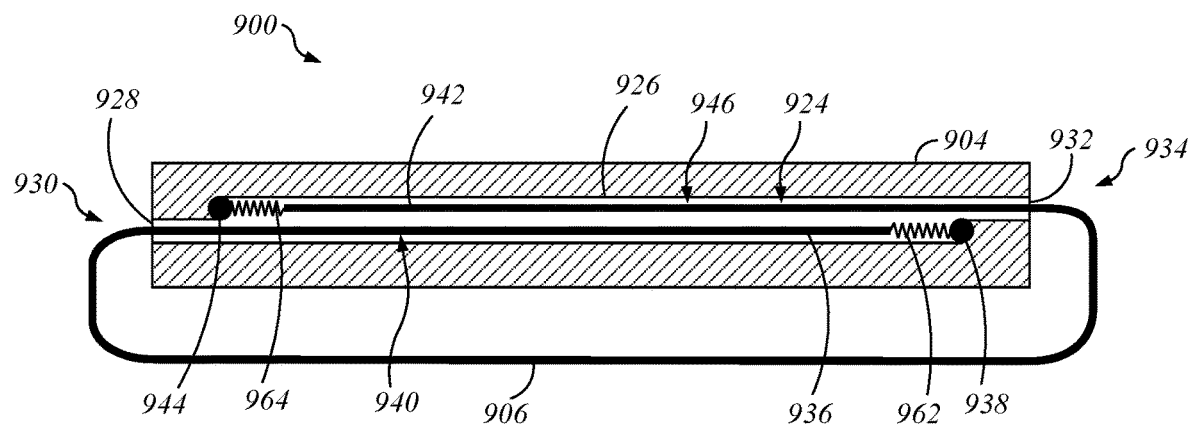
FIG. 9 is a top cross-sectional view taken along line A-A of FIG. 1 of a head mounted device according to an eighth example in a retracted position.

FIG. 9 is a top cross-sectional view taken along line A-A of FIG. 1 of a head mounted device 900 according to an eighth example in a retracted position. The head mounted device 900 may include features similar to those of the head mounted device 300 except as otherwise described. In the illustrated example, the head mounted device 900 includes a housing 904 and an elongate member 906. The housing 904 has an interior space 924 that defines a passage 926. The passage 926 extends from a first opening 928 located at a first lateral side 930 of the housing 904 to a second opening 932 located at a second lateral side 934 of the housing 904. A first attachment point 938 is disposed inside the passage 926 at a location near the second lateral side 934 of the housing 904. A second attachment point 944 is disposed inside the passage 926 at a location near the first lateral side 930 of the housing 904. The passage 926 is generally straight. The passage 926 may, however, be configured differently. As examples, the passage 926 may be straight, may be curved, may define a serpentine configuration, or may be configured according to any other shape.

In the illustrated example, a first end portion 936 of the elongate member 906 extends from the first attachment point 938, along a first path 940 through the passage 926, and to the first opening 928. A second end portion 942 extends from the second attachment point 944, along a second path 946 through the passage 926, and to the second opening 932.

The first end portion 936 may be connected to the housing 904 at the first attachment point 938 by a first spring 962.

The second end portion 942 may be connected to the housing 904 at the second attachment point 944 by a second spring 964. The first spring 962 and the second spring 964 may be linear or variable rate extension, torsion, coil, flat, constant force, or any other suitable type of spring. The first spring 962 may or may not be identical to the second spring 964.

Figure 10:
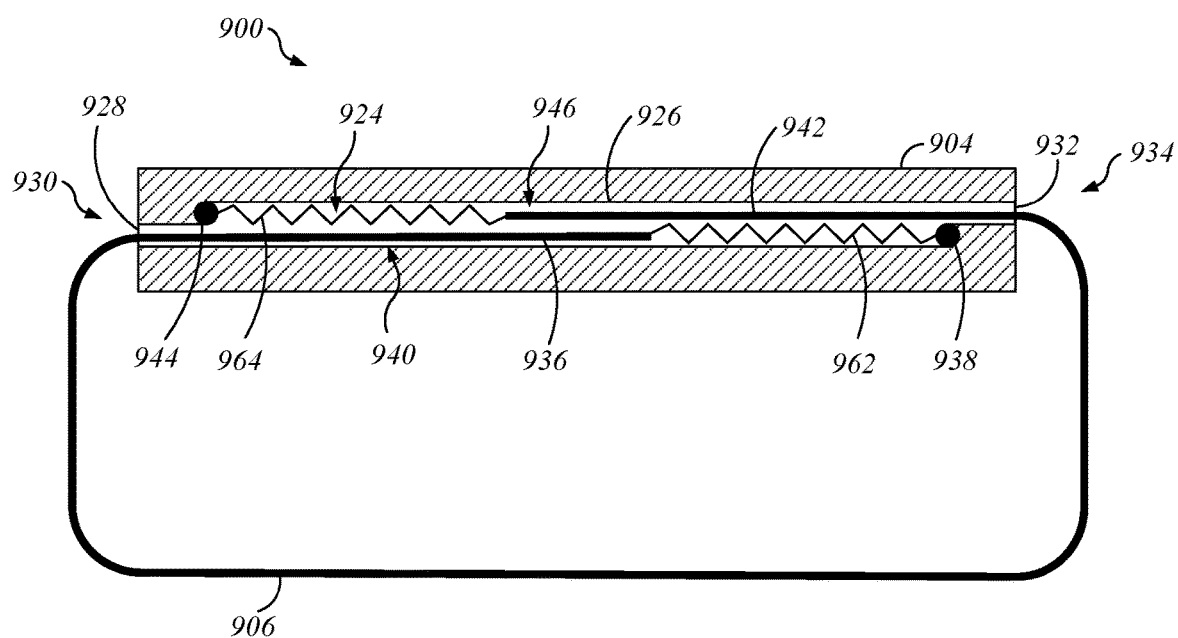
FIG. 10 is a top cross-sectional view taken along line A-A of FIG. 1 of the head mounted device according to the eighth example in an extended position.

FIG. 10 is a top cross-sectional view taken along line A-A of FIG. 1 of the head mounted device 900 according to the eighth example in an extended position. When the elongate member 906 is adjusted from the retracted position to the extended position (e.g., when the elongate member 906 is extended around the head of the user) the first spring 962 and the second spring 964 extend inside the passage 926 and exert tension on the elongate member 906. The tension exerted on the elongate member 906 by the first spring 962 and the second spring 964 allow the elongate member 906 to support the housing 904 relative to the user's head. In the extended position, part of the first end portion 936 and part of the second end portion 942 are extended out of the passage 926 to the exterior of the housing 904. When the elongate member 906 is removed from the user's head, the first spring 962 and the second spring 964 exert tension on the elongate member 906 until the first spring 962 and the second spring 964 are fully compressed. As a result, the first end portion 936 and the second end portion 942 of the elongate member 906 are retracted inside the passage 926, and the elongate member 906 returns to the retracted position.

Figure 11:
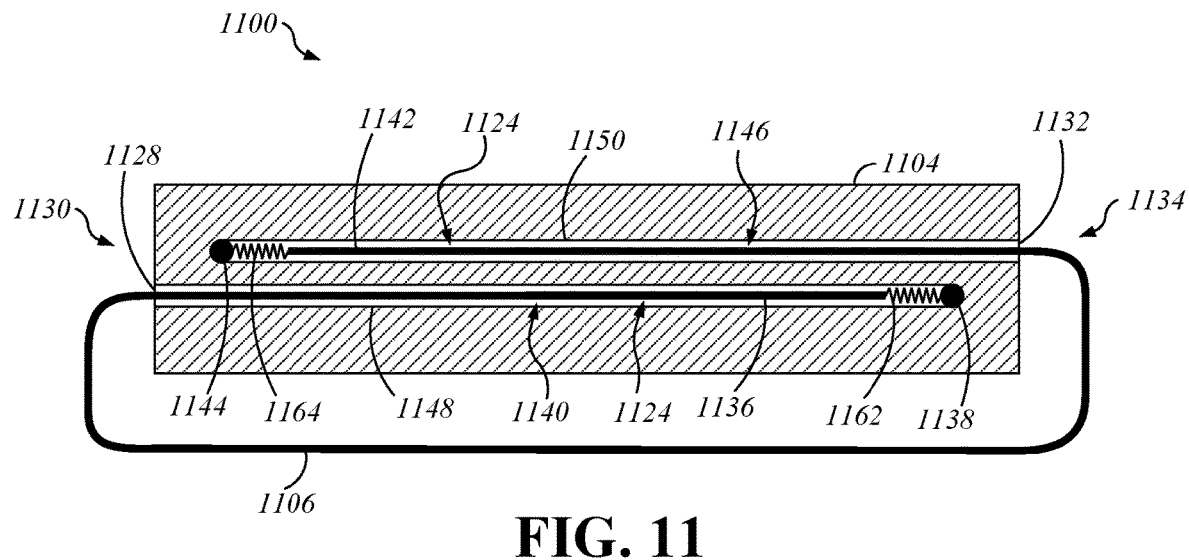
FIG. 11 is a top cross-sectional view taken along line A-A of FIG. 1 of a head mounted device according to a ninth example in a retracted position.

FIG. 11 is a top cross-sectional view taken along line A-A of FIG. 1 of a head mounted device 1100 according to a ninth example in a retracted position. The head mounted device 1100 may include features similar to those of the head mounted device 400 and the head mounted device 900 except as otherwise described. In the illustrated example, the head mounted device 1100 includes a housing 1104 and an elongate member 1106. The housing 1104 has an interior space 1124 that defines a first passage 1148 and a second passage 1150. The first passage 1148 extends laterally across the housing 1104 from a first opening 1128 to a first attachment point 1138 that is located in the first passage 1148 at a position that is near a second lateral side 1134 of the housing 1104. The second passage 1150 extends laterally from a second opening 1132 to a second attachment point 1144 that is located in the second passage 1150 at a position that is near a first lateral side 1130 of the housing 1104. The first passage 1148 and the second passage 1150 shown in the illustrated example are generally straight. The first passage 1148 and the second passage 1150 may, however, be configured differently. As examples, the first passage 1148 and the second passage 1150 may be straight, may be curved, may define a serpentine configuration, or may be configured according to any other shape. The first passage 1148 and the second passage 1150 may or may not be the same shape.

In the illustrated example, a first end portion 1136 of the elongate member 1106 extends from the first attachment point 1138, along a first path 1140 through the first passage 1148, and to the first opening 1128. A second end portion 1142 extends from the second attachment point 1144, along a second path 1146 through the second passage 1150, and to the second opening 1132.

The first end portion 1136 may be connected to the housing 1104 at the first attachment point 1138 by a first spring 1162. The second end portion 1142 may be connected to the housing 1104 at the second attachment point 1144 by a second spring 1164. The first spring 1162 and the second spring 1164 may be linear or variable rate extension, torsion, coil, flat, constant force, or any other suitable type of spring. The first spring 1162 may or may not be identical to the second spring 1164.

Figure 12:
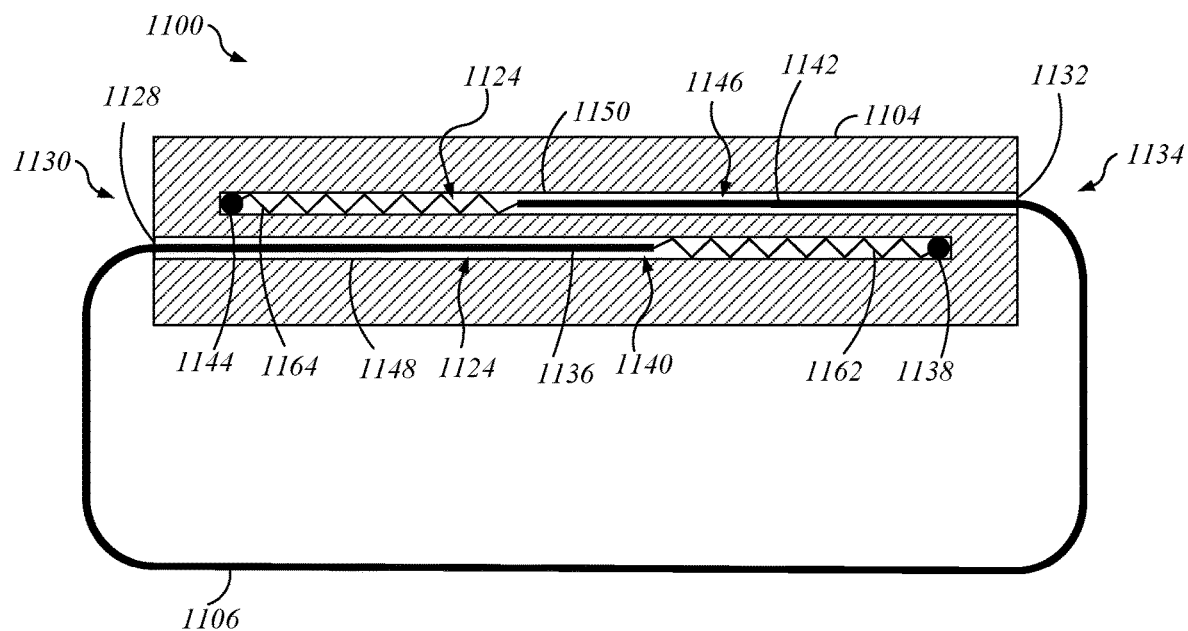
FIG. 12 is a top cross-sectional view taken along line A-A of FIG. 1 of the head mounted device according to the ninth example in an extended position.

FIG. 12 is a top cross-sectional view taken along line A-A of FIG. 1 of the head mounted device 1100 according to the ninth example in an extended position. When the elongate member 1106 is adjusted from the retracted position to the extended position, the first spring 1162 extends inside the first passage 1148, and the second spring 1164 extends inside the second passage 1150. The first spring 1162 and the second spring 1164 exert tension on the elongate member 1106. As described with respect to FIG. 10, this tension allows the elongate member 1106 to support the housing 1104 relative to the user's head. In the extended position, part of the first end portion 1136 extends out of the first passage 1148, and part of the second end portion 1142 extends out of the second passage 1150. When the elongate member 1106 is adjusted to the retracted position, the first spring 1162 retracts the first end portion 1136 into the interior space 1124, and the second spring 1164 retracts the second end portion 1142 into the interior space 1124.

Figure 13:
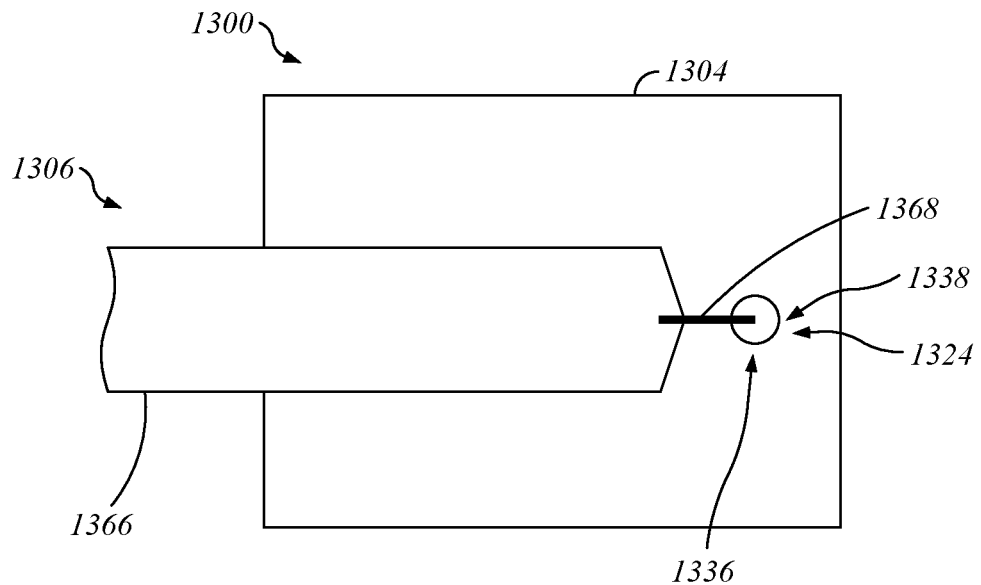
FIG. 13 is a side view of a head mounted device according to a tenth example in a retracted position.

FIG. 13 is a side view of a head mounted device 1300 according to a tenth example in a retracted position. The head mounted device 1300 may include features similar to those of any head mounted device described. In the illustrated example, the head mounted device 1300 includes an elongate member 1306 and a housing 1304. The elongate member 1306 includes a strap portion 1366 and a first cord 1368. The first cord 1368 defines a first end portion 1336. One end of the first cord 1368 is connected to a first attachment point 1338 inside the housing 1304. An opposite end of the first cord 1368 is connected to a first end of the strap portion 1366. In some embodiments, the elongate member 1306 may include a second cord (not shown) defining a second end portion. The second cord may be configured in the same way as the first cord 1368.

The first cord 1368 and the second cord may be retracted into an interior space 1324 of the housing 1304 when the elongate member 1306 is in the retracted position. The first cord 1368 and the second cord may expand and contract elastically to adjust the length of the elongate member 1306. The strap portion 1366 may have a greater width than the first cord 1368 and the second cord and may retain the head of the user. In some embodiments, the first cord 1368 and the second cord may be more elastic than the strap portion 1366. The elongate member 1306 may include the first cord 1368, the strap portion 1366, and the second cord in any described embodiment.

Figure 14:
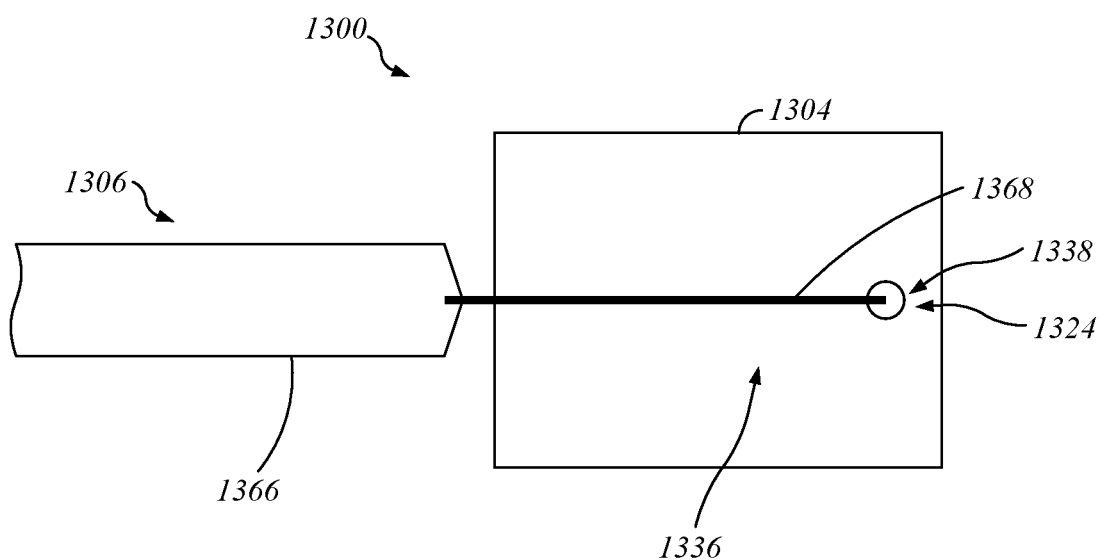
FIG. 14 is a side view of the head mounted device according to the tenth example in an extended position.

FIG. 14 is a side view of the head mounted device 1300 according to the tenth example in an extended position. In the illustrated example, part of the first cord 1368 extends from inside the interior space 1324 of the housing 1304. In some embodiments, part of the second cord also extends from inside the interior space 1324 of the housing 1304 when the elongate member 1306 is in the extended position. In the extended position, the strap portion 1366 may be engaged with a back portion of the user's head.

Figure 15:
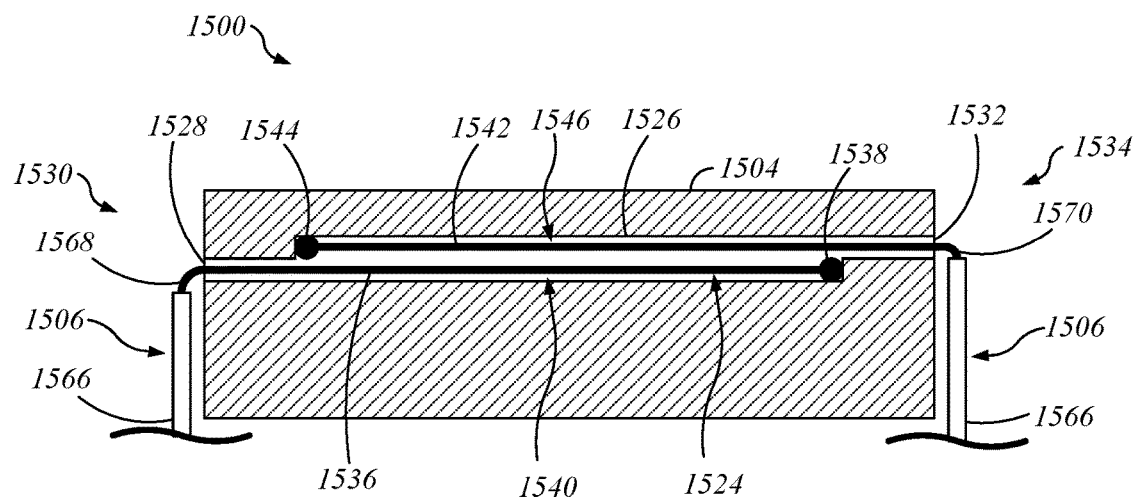
FIG. 15 is a top cross-sectional view taken along line A-A of FIG. 1 of a head mounted device according to an eleventh example in a retracted position.

FIG. 15 is a top cross-sectional view taken along line A-A of FIG. 1 of a head mounted device 1500 according to an eleventh example in a retracted position. The head mounted device 1500 may include features of the head mounted device 300 except as otherwise described. In the illustrated example, the head mounted device 1500 includes a housing 1504 and an elongate member 1506. The housing 1504 has an interior space 1524 that defines a passage 1526. The passage 1526 extends from a first opening 1528 located at a first lateral side 1530 of the housing 1504 to a second opening 1532 located at a second lateral side 1534 of the housing 1504. A first attachment point 1538 is disposed inside the passage 1526 at a location near the second lateral side 1534 of the housing 1504. A second attachment point 1544 is disposed inside the passage 1526 at a location near the first lateral side 1530 of the housing 1504. The passage 1526 is generally straight. The passage 1526 may, however, be configured differently. As examples, the passage 1526 may be straight, may be curved, may define a serpentine configuration, or may be configured according to any other shape.

In the illustrated example, a first end portion 1536 of the elongate member 1506 extends from the first attachment point 1538, along a first path 1540 through the passage 1526, and to the first opening 1528. A second end portion 1542 extends from the second attachment point 1544, along a second path 1546 through the passage 1526, and to the second opening 1532.

The elongate member 1506 may include a first cord 1568 that defines the first end portion 1536, a second cord 1570 that defines the second end portion 1542, and a strap portion 1566 that connects the first cord 1568 and the second cord 1570. The first cord 1568 extends from the strap portion 1566 to the first attachment point 1538. The second cord 1570 extends from the strap portion 1566 to the second attachment point 1544. In the retracted position, the first cord 1568 and the second cord 1570 are retracted into the interior space 1524 of the housing 1504 while the strap portion 1566 remains exterior to the housing 1504.

Figure 16:
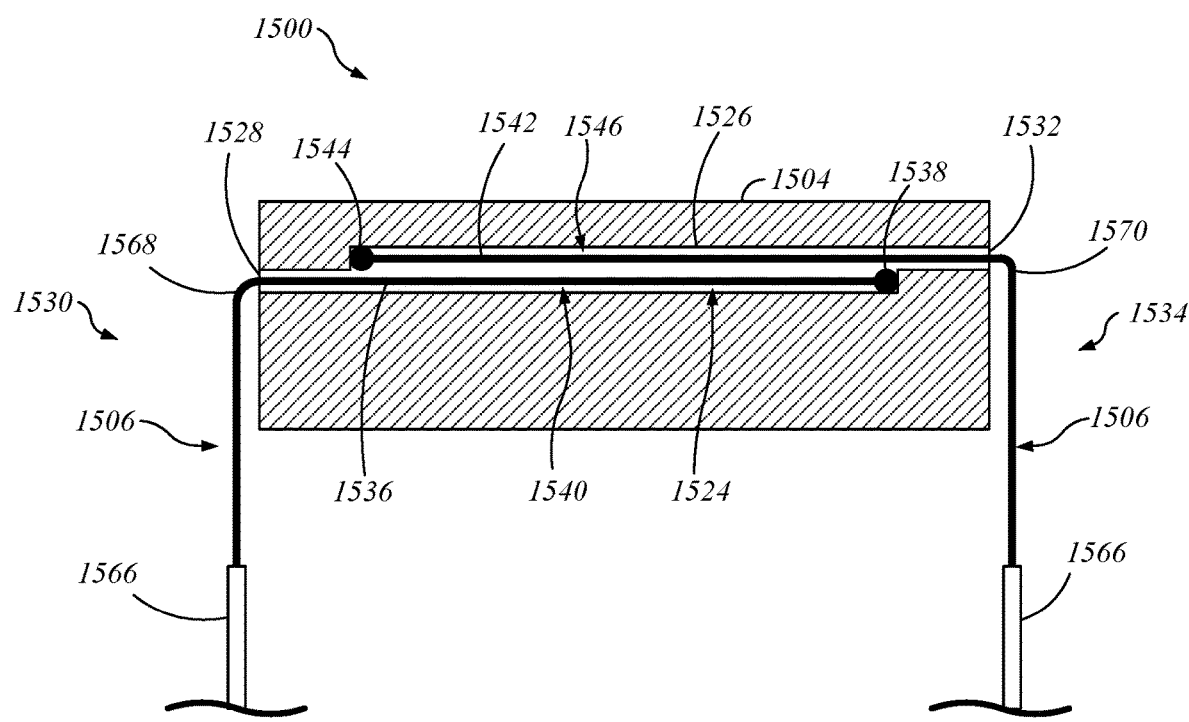
FIG. 16 is a top cross-sectional view taken along line A-A of FIG. 1 of the head mounted device according to the eleventh example in an extended position.

FIG. 16 is a top cross-sectional view taken along line A-A of FIG. 1 of the head mounted device 1500 according to the eleventh example in an extended position. In the extended position, part of the first cord 1568 and part of the second cord 1570 extend from inside the interior space 1524 of the housing 1504 to the exterior of the housing 1504. In the extended position, the strap portion 1566 may extend around the user's head.

Figure 17:
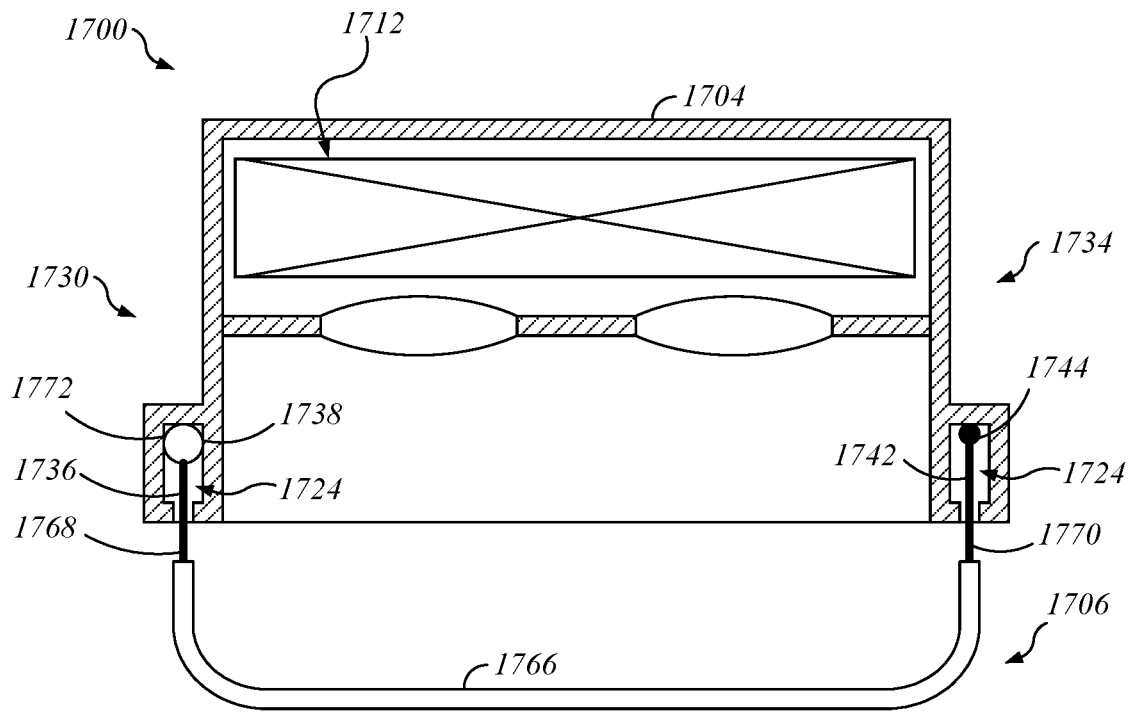
FIG. 17 is a top cross-sectional view taken along line A-A of FIG. 1 of a head mounted device according to a twelfth example.

FIG. 17 is a top cross-sectional view taken along line A-A of FIG. 1 of a head mounted device 1700 according to a twelfth example. The head mounted device 1700 may include features similar to those of any head mounted device previously described. In the illustrated example, the head mounted device 1700 includes a housing 1704, an elongate member 1706, and an elongate member control mechanism 1772 coupled to an interior space 1724 of the housing 1704 in a location near a first lateral side 1730 of the housing 1704. A first end portion 1736 of the elongate member 1706 is connected to the elongate member control mechanism 1772 at a first attachment point 1738 located in the interior space 1724 of the housing 1704 near the first lateral side 1730 of the housing 1704. A second end portion 1742 of the elongate member 1706 is connected to the housing 1704 at a second attachment point 1744. The second attachment point 1744 is located in the interior space 1724 of the housing 1704 near a second lateral side 1734 of the housing 1704. The elongate member 1706 may include a first cord 1768 that defines the first end portion 1736, a second cord 1770 that defines the second end portion 1742, and a strap portion 1766 that connects the first cord 1768 and the second cord 1770.

The elongate member control mechanism 1772 is operable to extend the elongate member 1706 outside of the interior space 1724 of the housing 1704 and/or retract the elongate member 1706 inside the interior space 1724 of the housing 1704. The elongate member control mechanism 1772 can include a spool, winch, reel, ratchet, wheel, winder, or other device capable of retracting and/or extending a portion of the elongate member 1706. The elongate member control mechanism 1772 may be actuated to extend and/or retract the elongate member 1706 by using any type of spring, spring-loaded spool, motorized spool, or other suitable extension and/or retraction mechanism. The elongate member control mechanism 1772 may apply axial tension on the elongate member 1706 to retract the elongate member 1706. In some embodiments including the motorized spool, the motorized spool may be actuated by a stepper motor, linear motor, or any other suitable motor. The motorized spool may selectively extend and retract the elongate member 1706 between the retracted and extended positions. The motorized spool may be activated by a controller 1712 or by the user via a button, switch, or the like. The controller 1712 may include features similar to those of the controller 212.

In some embodiments, the head mounted device 1700 may include an identity sensor adapted to detect a user identity. The identity sensor may be included in the sensors 210. The identity sensor may be a biometric sensor and detect the user's retina, face, fingerprints, or the like. The identity sensor may also detect gestures and/or other devices associated with the user, such as a smartphone.

In response to receiving a signal from the identity sensor indicative of the user's identity, the controller 1712 may select a user identity profile corresponding to the user's identity. The user identity profile may include user settings, such as an operative length of the elongate member 1706. The operative length of the elongate member 1706 may be the length of the elongate member 1706 extending around the user's head and/or the length of the elongate member 1706 retracted from the motorized spool.

In response to selecting the user identity profile, the controller 1712 may use the elongate member control mechanism 1772 to extend or retract the elongate member 1706 to the operative length according to the user identity profile.

In some embodiments, the head mounted device 1700 may include a haptic feedback feature. The controller 1712 may receive a signal indicative of images or other content experienced by the user. The content may include any media, still images, video, audio, or other information. In response to receiving the signal indicative of the content, the controller 1712 may use the elongate member control mechanism 1772 to extend or retract the elongate member 1706. As a result, the elongate member control mechanism 1772 may tighten or loosen the elongate member 1706 around the user's head in response to the content.

In some embodiments, the head mounted device 1700 may include a pressure sensor in electrical communication with the controller 1712. The pressure sensor may be included in the sensors 210. The pressure sensor may be adapted to measure pressure between the head mounted device 1700 and the head of the user. In some embodiments, the content experienced by the user may be associated with a pressure value. In response to receiving a signal indicative of the content, the controller 1712 may cause the motorized spool to extend or retract the elongate member 1706 until the pressure (measured by the pressure sensor) between the user's head and the head mounted device 1700 reaches the pressure value.

In some embodiments, the controller 1712 may cause the motorized spool to extend or retract the elongate member 1706 in response to receiving a signal indicative of pressure (measured by the pressure sensor) between the user's head and the head mounted device 1700. The controller 1712 may compare the measured pressure to a predetermined pressure value. Based on a determination that the measured pressure is not equal to the predetermined pressure value, the controller 1712 may use the elongate member control mechanism 1772 to extend or retract the elongate member 1706 to decrease or increase the pressure between the user's head and the head mounted device 1700 to the pressure value.

Figure 18:
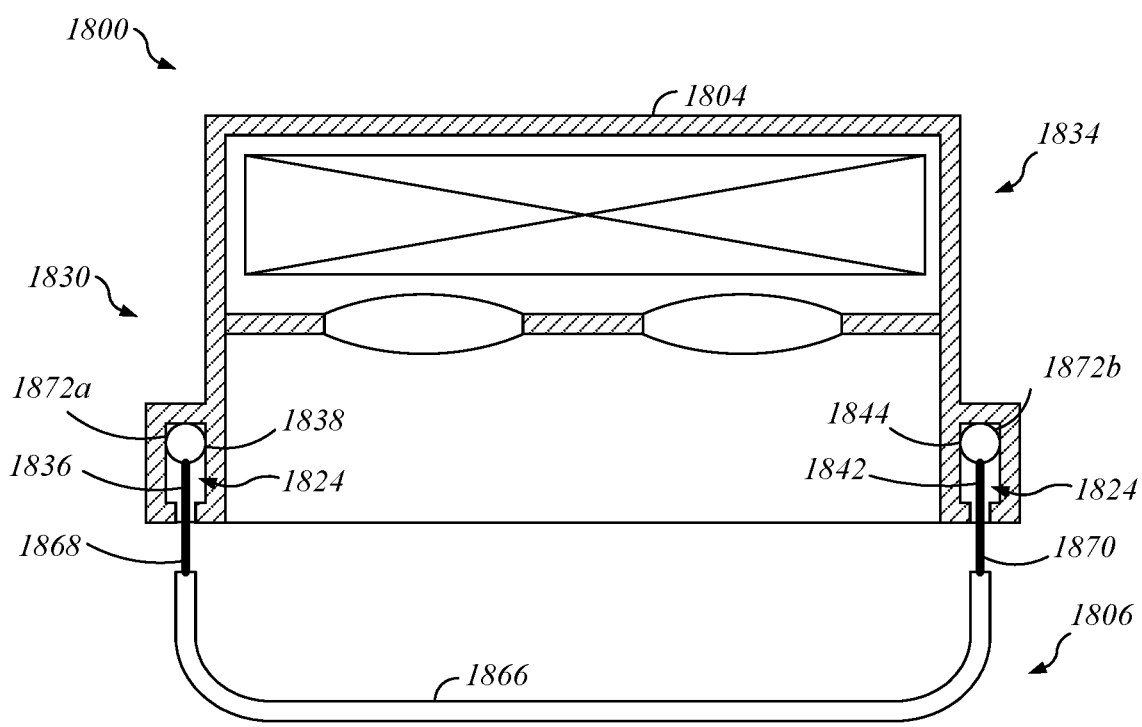
FIG. 18 is a top cross-sectional view taken along line A-A of FIG. 1 of a head mounted device according to a thirteenth example.

FIG. 18 is a top cross-sectional view taken along line A-A of FIG. 1 of a head mounted device 1800 according to a thirteenth example. The head mounted device 1800 may include features similar to those of the head mounted device 1700 except as otherwise described. In the illustrated example, the head mounted device 1800 includes a housing 1804 and an elongate member 1806. The head mounted device 1800 includes a first elongate member control mechanism 1872*a* coupled to an interior space 1824 of the housing 1804 in a location near a first lateral side 1830 of the housing 1804. The head mounted device 1800 includes a second elongate member control mechanism 1872*b* coupled to the interior space 1824 of the housing 1804 in a location near a second lateral side 1834 of the housing 1804. The first elongate member control mechanism 1872*a* and the second elongate member control mechanism 1872*b* may include features similar to those of the elongate member control mechanism 1772.

A first end portion 1836 of the elongate member 1806 is connected to the first elongate member control mechanism 1872*a* at a first attachment point 1838. The first attachment point 1838 is located in the interior space 1824 of the housing 1804 near the first lateral side 1830 of the housing 1804. A second end portion 1842 of the elongate member 1806 is connected to the second elongate member control mechanism 1872*b* at a second attachment point 1844. The second attachment point 1844 is located in the interior space 1824 of the housing 1804 near the second lateral side 1834 of the housing 1804. The elongate member 1806 may include a first cord 1868 that defines the first end portion 1836, a second cord 1870 that defines the second end portion 1842, and a strap portion 1866 that connects the first cord 1868 and the second cord 1870. The first elongate member control mechanism 1872*a* is operable to extend and/or retract the first end portion 1836 of the elongate member 1806. The second elongate member control mechanism 1872*b* is operable to extend and/or retract the second end portion 1842 of the elongate member 1806.

Figure 19:
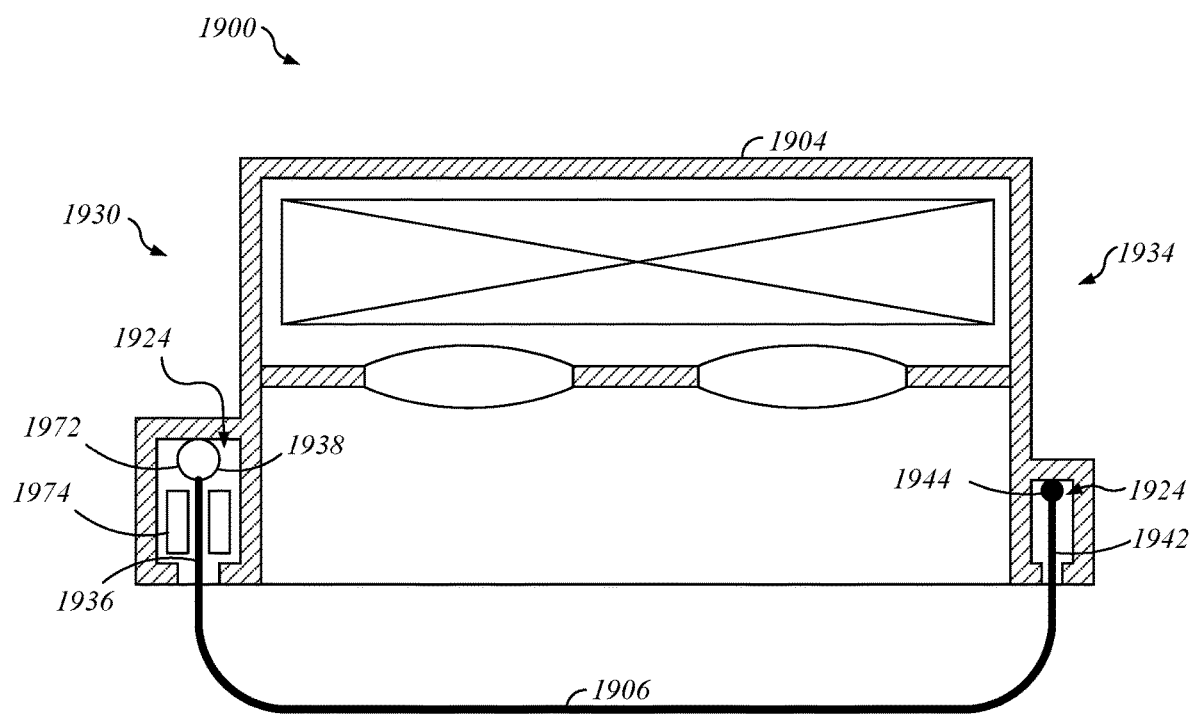
FIG. 19 is a top cross-sectional view taken along line A-A of FIG. 1 of a head mounted device according to a fourteenth example.

FIG. 19 is a top cross-sectional view taken along line A-A of FIG. 1 of a head mounted device 1900 according to a fourteenth example. The head mounted device 1900 may include features similar to those of the head mounted device 1700 except as otherwise described. In the illustrated example, the head mounted device 1900 includes a housing 1904, an elongate member 1906, and an elongate member control mechanism 1972 coupled to an interior space 1924 of the housing 1904 in a location near a first lateral side 1930 of the housing 1904. The elongate member control mechanism 1972 may include features similar to those of the elongate member control mechanism 1772. A first end portion 1936 of the elongate member 1906 is connected to the elongate member control mechanism 1972 at a first attachment point 1938 located in the interior space 1924 of the housing 1904 near the first lateral side 1930 of the housing 1904. A second end portion 1942 of the elongate member 1906 is connected to the housing 1904 at a second attachment point 1944. The second attachment point 1944 is located in the interior space 1924 of the housing 1904 near a second lateral side 1934 of the housing 1904.

The head mounted device 1900 includes an elongate member retaining mechanism 1974 connected to the housing 1904 near the first lateral side 1930. The elongate member retaining mechanism 1974 is operable to engage the elongate member 1906 to restrain extension and retraction of the elongate member 1906 from the interior space 1924 of the housing 1904. The elongate member retaining mechanism 1974 may be connected to the housing 1904 in the interior space 1924 of the housing 1904 or on an exterior of the housing 1904.

Figure 20:
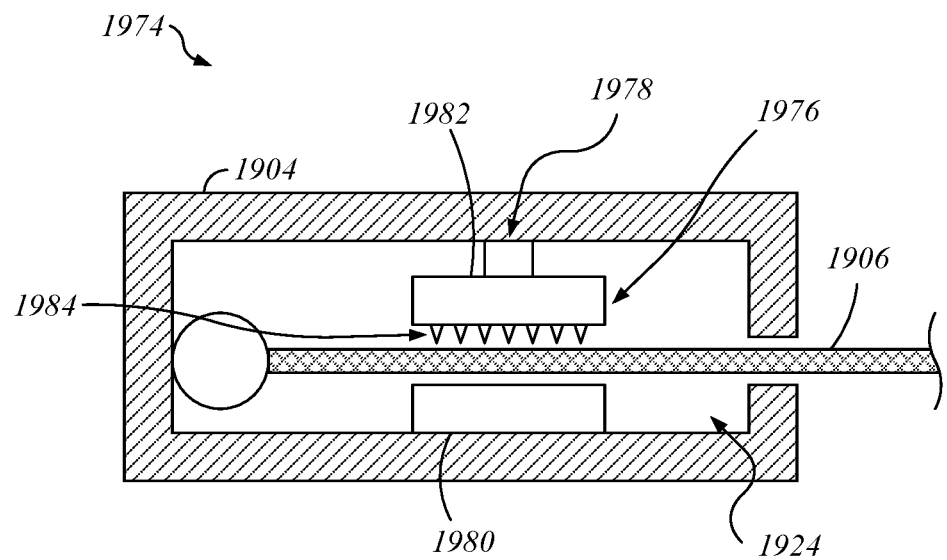
FIG. 20 is a side view of an elongate member retaining mechanism in an open position.
Figure 21:
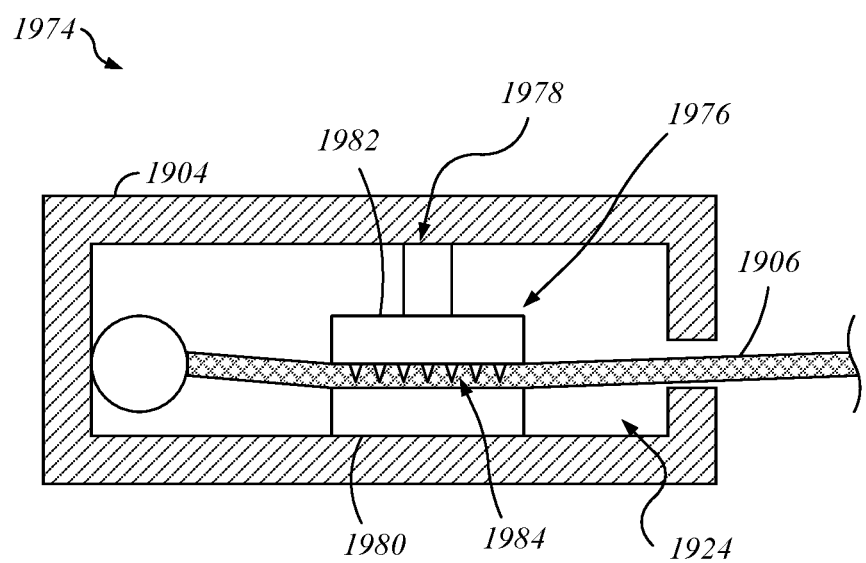
FIG. 21 is a side view of the elongate member retaining mechanism of FIG. 20 in a closed position.

FIG. 20 is a side view of the elongate member retaining mechanism 1974 in an open position. FIG. 21 is a side view of the elongate member retaining mechanism 1974 of FIG. 20 in a closed position. The elongate member retaining mechanism 1974 may include a clamp 1976 through which the elongate member 1906 extends and an actuator 1978 connected to the clamp 1976. The actuator 1978 may selectively close the clamp 1976 to retain the elongate member 1906 in a closed position and open the clamp 1976 to release the elongate member 1906 in an open position. The actuator 1978 may include a magnet and electromagnet, solenoid, spring, motor, or any other suitable actuator. The actuator 1978 may be in electrical communication with a controller. The controller may include features similar to those of the controller 212. The controller may use the actuator 1978 to move the elongate member retaining mechanism 1974 into the closed position to restrain the elongate member 1906 in the retracted position or the extended position.

In the illustrated example, the clamp 1976 includes a first member 1980 and a second member 1982. The first member 1980 and the second member 1982 are connected to the housing 1904 such that a portion of the elongate member 1906 extends between the first member 1980 and the second member 1982. The actuator 1978 may be connected to the first member 1980, the second member 1982, or both the first member 1980 and the second member 1982. The actuator 1978 may move the first member 1980, the second member 1982, or both the first member 1980 and the second member 1982 to the closed position. In some embodiments, the second member 1982 may include a portion of the housing 1904.

In the illustrated example, the first member 1980, the second member 1982, or both the first member 1980 and the second member 1982 may include protrusions 1984 configured to retain the elongate member 1906 between the first member 1980 and the second member 1982 when the clamp 1976 is in the closed position. The first member 1980, the second member 1982, or both the first member 1980 and the second member 1982 may include recesses corresponding to the protrusions 1984 such that the protrusions 1984 press the elongate member 1906 into the recesses when the clamp 1976 is in the closed position.

Figure 22:
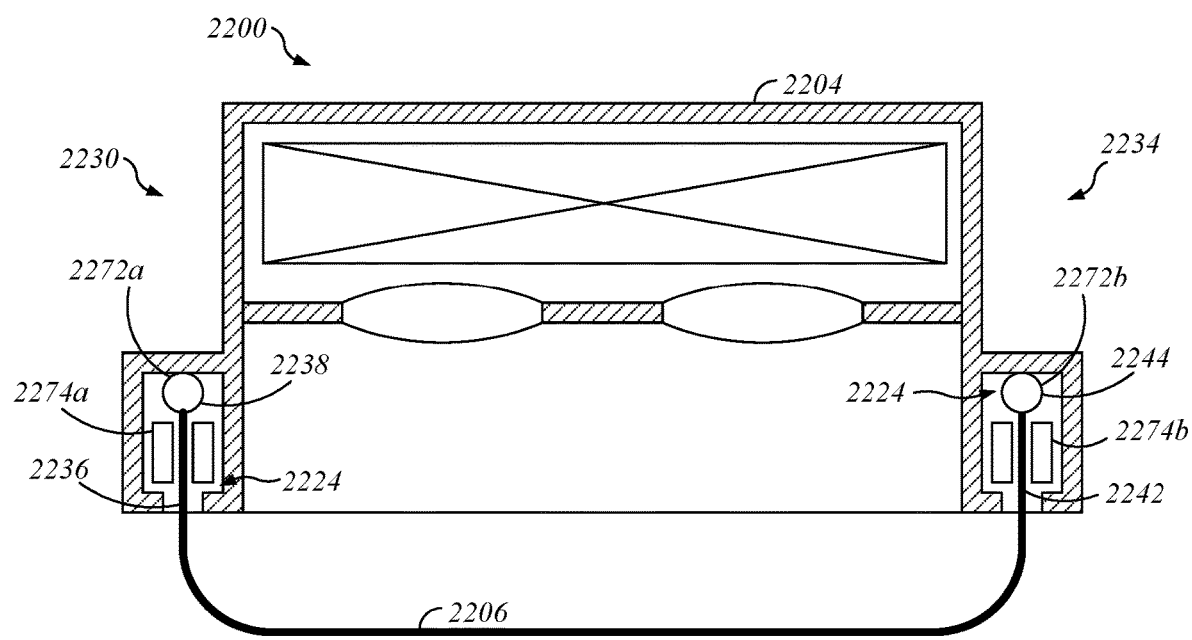
FIG. 22 is a top cross-sectional view taken along line A-A of FIG. 1 of a head mounted device according to a fifteenth example.

FIG. 22 is a top cross-sectional view taken along line A-A of FIG. 1 of a head mounted device 2200 according to a fifteenth example. The head mounted device 2200 may include features similar to those of the head mounted device 1800 and the head mounted device 1900 except as otherwise described. In the illustrated example, the head mounted device 2200 includes a housing 2204 and an elongate member 2206. The head mounted device 2200 includes a first elongate member control mechanism 2272*a* coupled to an interior space 2224 of the housing 2204 in a location near a first lateral side 2230 of the housing 2204. The head mounted device 2200 includes a second elongate member control mechanism 2272*b* coupled to the interior space 2224 of the housing 2204 in a location near a second lateral side 2234 of the housing 2204. The first elongate member control mechanism 2272*a* and the second elongate member control mechanism 2272b may include features similar to those of the elongate member control mechanism 1772.

A first end portion 2236 of the elongate member 2206 is connected to the first elongate member control mechanism 2272a at a first attachment point 2238. The first attachment point 2238 is located in the interior space 2224 of the housing 2204 near the first lateral side 2230 of the housing 2204. A second end portion 2242 of the elongate member 2206 is connected to the second elongate member control mechanism 2272b at a second attachment point 2244. The second attachment point 2244 is located in the interior space 2224 of the housing 2204 near the second lateral side 2234 of the housing 2204.

The head mounted device 2200 may include a first elongate member retaining mechanism 2274a and a second elongate member retaining mechanism 2274b. The first elongate member retaining mechanism 2274a and the second elongate member retaining mechanism 2274b may include features similar to those of the elongate member retaining mechanism 1974. The first elongate member retaining mechanism 2274a and the second elongate member retaining mechanism 2274b may include features similar to those of the elongate member retaining mechanism 1974. The first elongate member retaining mechanism 2274a is connected to the housing 2204 near the first lateral side 2230. The second elongate member retaining mechanism 2274b is connected to the housing 2204 near the second lateral side 2234. The first elongate member retaining mechanism 2274a restrains the first end portion 2236 of the elongate member 2206 from being extended from or retracted into the interior space 2224 of the housing 2204. The second elongate member retaining mechanism 2274b restrains the second end portion 2242 of the elongate member 2206 from being extended from or retracted into the interior space 2224 of the housing 2204.

Figure 23:
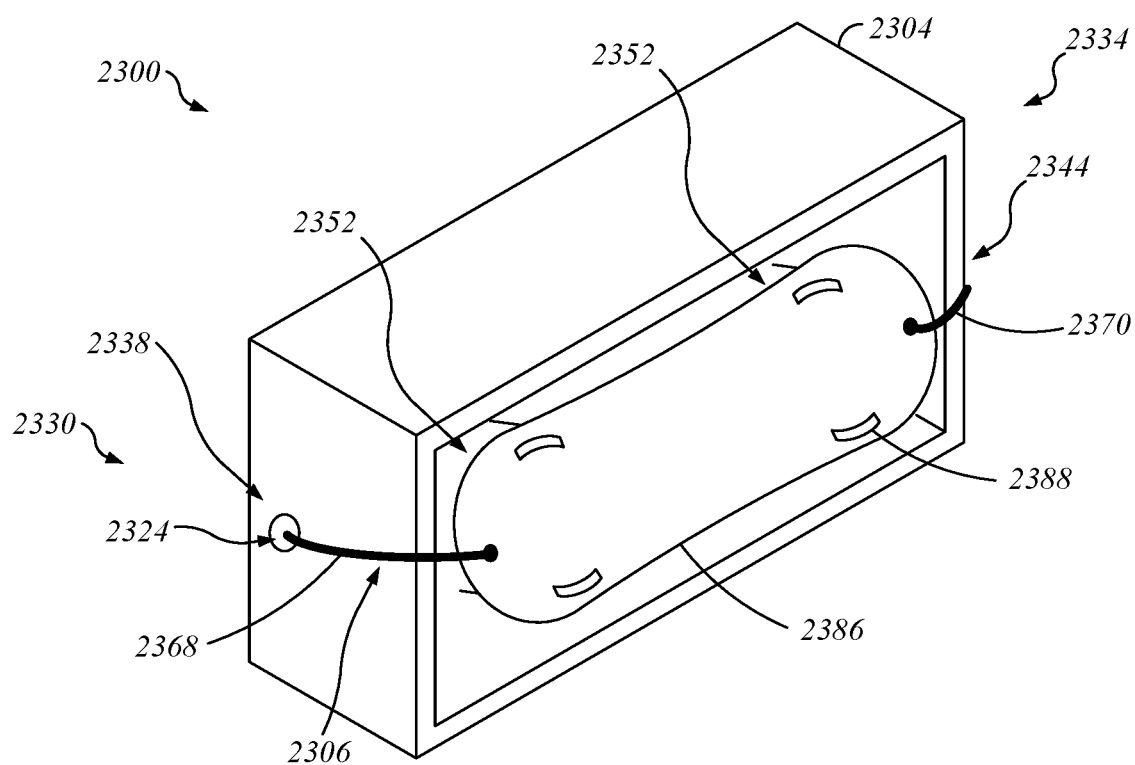
FIG. 23 is a perspective view of a head mounted device according to a sixteenth example in a connected position.
Figure 24:
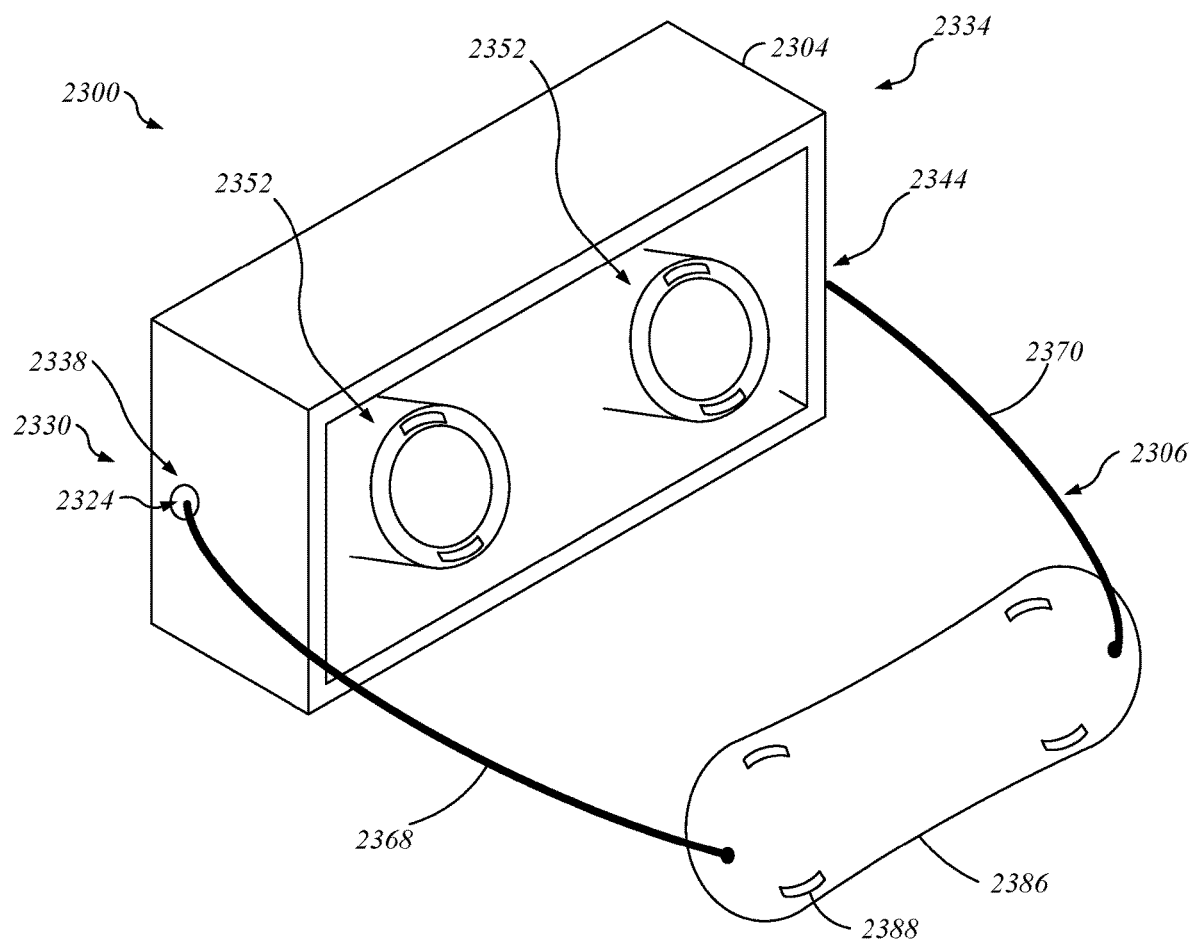
FIG. 24 is a perspective view of the head mounted device according to the sixteenth example in a disconnected position.

FIG. 23 is a perspective view of a head mounted device 2300 according to a sixteenth example in a connected position. FIG. 24 is a perspective view of the head mounted device 2300 according to the sixteenth example in a disconnected position. The head mounted device 2300 may include features similar to those of any described head mounted device. In the illustrated example, the head mounted device 2300 includes a housing 2304 and an elongate member 2306. The head mounted device 2300 includes lenses 2352 coupled to the housing 2304. The elongate member 2306 includes a first cord 2368, a second cord 2370, and a lens cover 2386 having at least one connector 2388. One end of the lens cover 2386 is connected to a first attachment point 2338 using the first cord 2368. The first attachment point 2338 is disposed in an interior space 2324 of the housing 2304 in a location near a first lateral side 2330 of the housing 2304. The other end of the lens cover 2386 is connected to a second attachment point 2344 using the second cord 2370. The second attachment point 2344 is disposed in the interior space 2324 of the housing 2304 in a location near a second lateral side 2334 of the housing 2304.

The at least one connector 2388 removably connects to the housing 2304 and may be disposed on the periphery of the lens cover 2386. The at least one connector 2388 may include any type of adhesive, magnets, stitching, hook-and-loop fasteners, welding, rivets, interference fit, snaps, fastener, or any other type of attachment. The housing 2304 may include connectors corresponding to the at least one connector 2388 disposed around the periphery of the lenses 2352 or at any other location on the housing 2304. The at least one connector 2388 may removably connect to the corresponding connectors. The corresponding connectors may include any described attachment.

The lens cover 2386 is moveable relative to the housing 2304 between a connected position and a disconnected position. In the connected position shown in FIG. 23, the lens cover 2386 is connected to the housing 2304 using the at least one connector 2388 and substantially covers the lenses 2352. In the disconnected position shown in FIG. 24, the lens cover 2386 contacts the back portion of the user's head when the elongate member 2306 is extended around the user's head.

Figure 25:
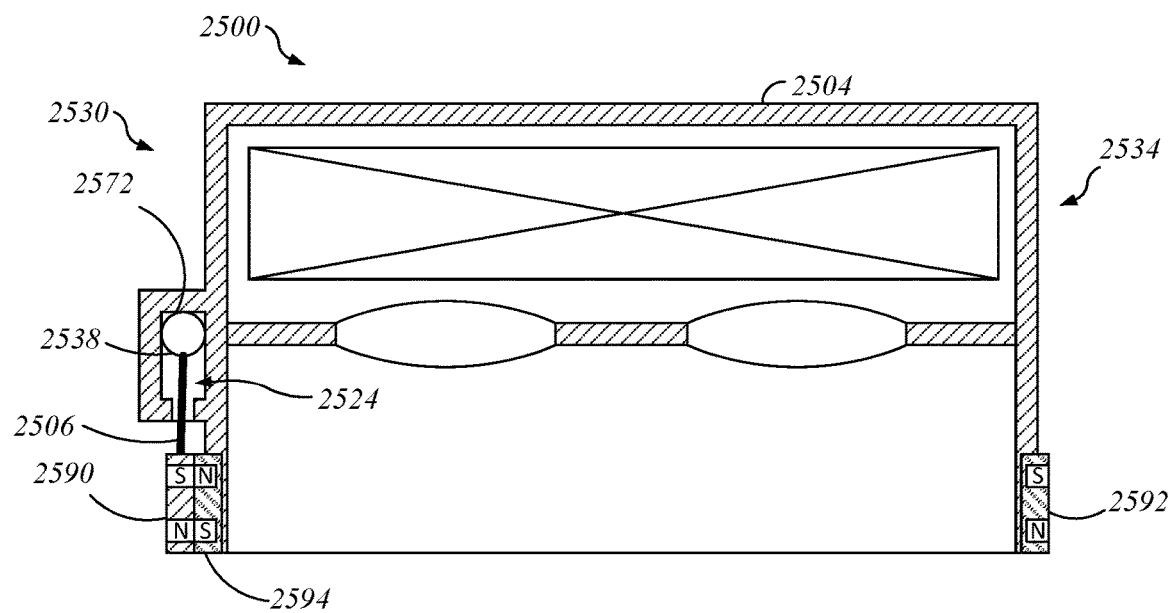
FIG. 25 is a top cross-sectional view taken along line A-A of FIG. 1 of a head mounted device according to a seventeenth example in a retracted position.
Figure 26:
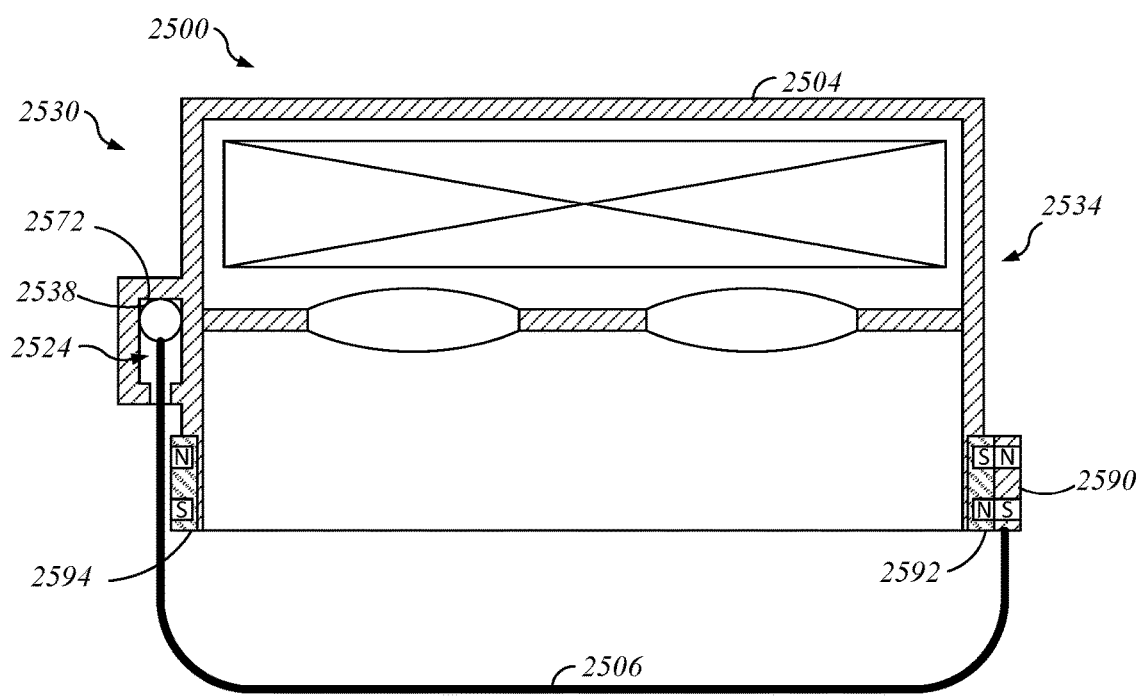
FIG. 26 is a top cross-sectional view taken along line A-A of FIG. 1 of the head mounted device according to the seventeenth example in an extended position.

FIG. 25 is a top cross-sectional view taken along line A-A of FIG. 1 of a head mounted device 2500 according to a seventeenth example in a retracted position. FIG. 26 is a top cross-sectional view taken along line A-A of FIG. 1 of the head mounted device 2500 according to the seventeenth example in an extended position. The head mounted device 2500 may include features similar to any head mounted device previously described. In the illustrated examples, the head mounted device 2500 includes a housing 2504 and an elongate member 2506. The elongate member 2506 is connected at one end to an elongate member control mechanism 2572 at a first attachment point 2538 disposed in an interior space 2524 of the housing 2504 in a location near a first lateral side 2530 of the housing 2504. The elongate member control mechanism 2572 may include features similar to those of the elongate member control mechanism 1772. The elongate member 2506 is connected at the other end to a first magnetic connector 2590. A second magnetic connector 2592 is connected to the housing 2504 near the second lateral side 2534. A third magnetic connector 2594 is connected to the housing 2504 near the first lateral side 2530. The first magnetic connector 2590, the second magnetic connector 2592, and the third magnetic connector 2594 may be any type of magnet or electromagnet of any shape and size. The magnetic poles of the first magnetic connector 2590, the second magnetic connector 2592, and the third magnetic connector 2594 may have any orientation.

The first magnetic connector 2590 and the second magnetic connector 2592 may be movable between a connected position and a disconnected position. In the disconnected position shown in FIG. 25, the elongate member 2506 is retracted into the interior space 2524, and the first magnetic connector 2590 is connected to the third magnetic connector 2594 for storage of the elongate member 2506. In the disconnected position, the elongate member 2506 is not extended around the user's head, and the housing 2504 is released with respect to the head of the user. In the connected position shown in FIG. 26, the elongate member 2506 is extended out of the interior space 2524, and the first magnetic connector 2590 is connected to the second magnetic connector 2592. In the connected position, the elongate member 2506 may be extended around the user's head, and the housing 2504 may be secured relative to the user's head.

In some embodiments, the first magnetic connector 2590 may include a magnetic protrusion, and the second magnetic connector 2592 may include a corresponding magnetic recess. In the connected position, the magnetic protrusion of the first magnetic connector 2590 may be connected to the second magnetic connector 2592 inside the magnetic recess. Additionally and/or alternatively, the first magnetic connector 2590 may include the magnetic recess, and the second magnetic connector 2592 may include the magnetic protrusion.

Figure 27:
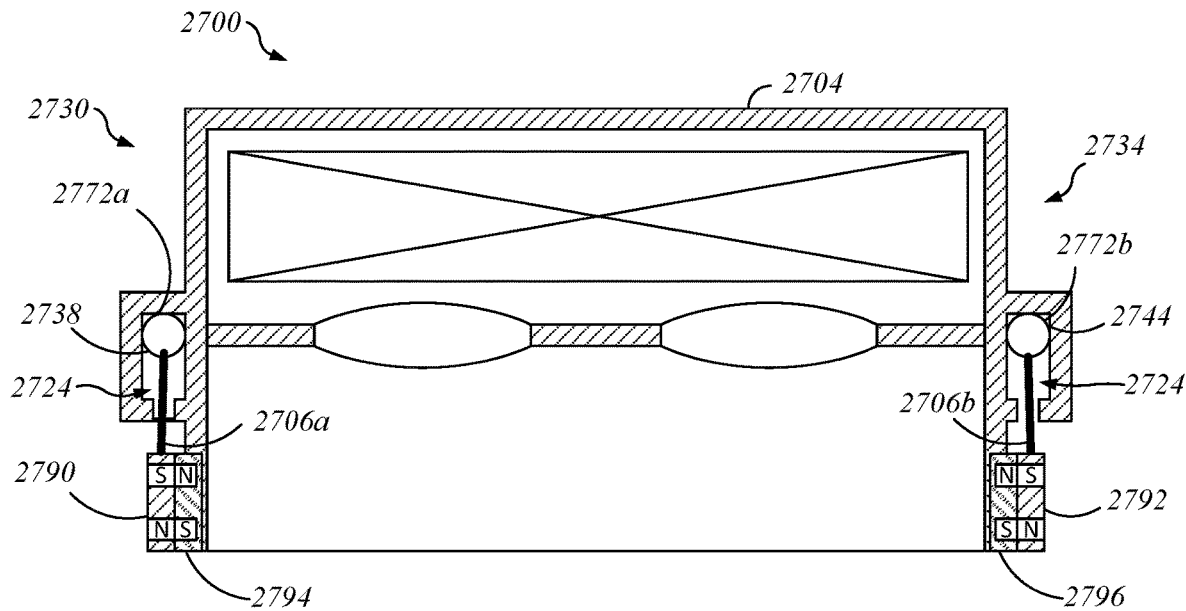
FIG. 27 is a top cross-sectional view taken along line A-A of FIG. 1 of a head mounted device according to an eighteenth example in a retracted position.
Figure 28:
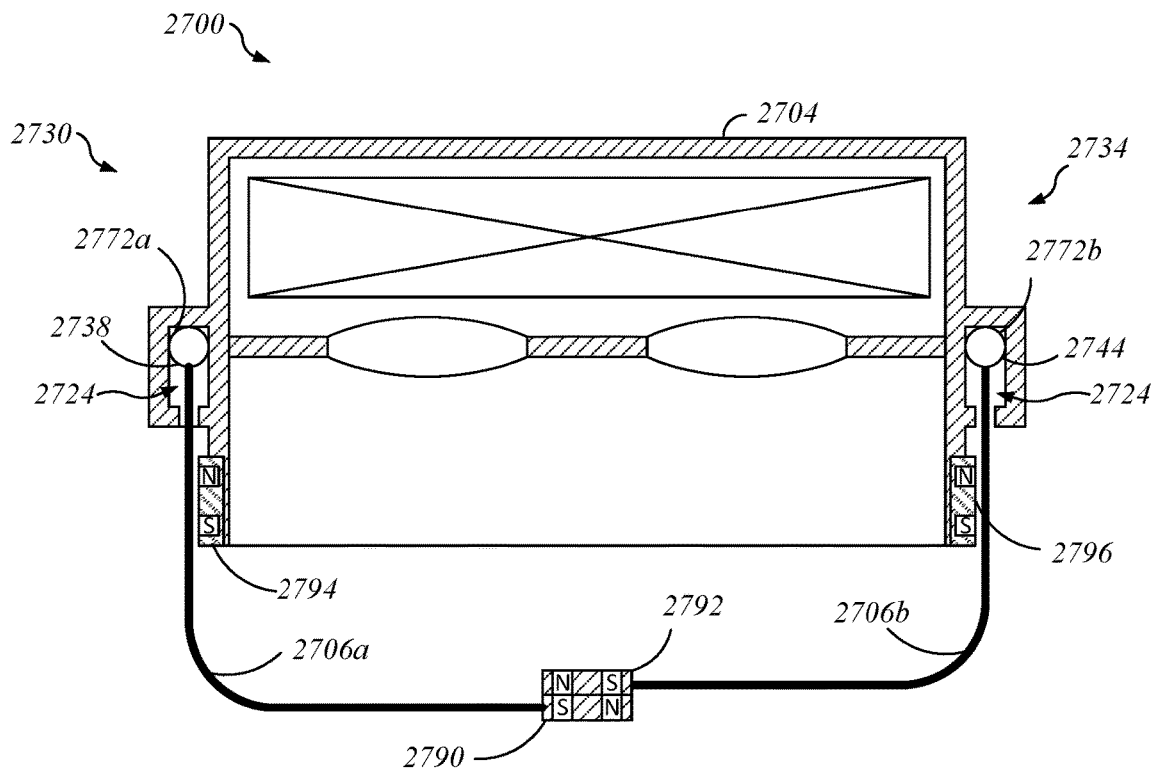
FIG. 28 is a top cross-sectional view taken along line A-A of FIG. of the head mounted device according to the eighteenth example in an extended position.

FIG. 27 is a top cross-sectional view taken along line A-A of FIG. 1 of a head mounted device 2700 according to an eighteenth example in a retracted position. FIG. 28 is a top cross-sectional view taken along line A-A of FIG. 1 of the head mounted device 2700 according to the eighteenth example in an extended position. The head mounted device 2700 may include features similar to those of the head mounted device 2500 except as otherwise described. In the illustrated examples, the head mounted device 2700 includes a housing 2704, a first elongate member 2706a, and a second elongate member 2706b. The first elongate member 2706a is connected at one end to a first elongate member control mechanism 2772a at a first attachment point 2738 disposed in an interior space 2724 of the housing 2704 in a location near a first lateral side 2730 of the housing 2704. The other end of the first elongate member 2706a is connected to a first magnetic connector 2790. The second elongate member 2706b is connected at one end to a second elongate member control mechanism 2772b at a second attachment point 2744 disposed in the interior space 2724 of the housing 2704 in a location near a second lateral side 2734 of the housing 2704. The other end of the second elongate member 2706b is connected to a second magnetic connector 2792. The first elongate member control mechanism 2772a and the second elongate member control mechanism 2772b may include features similar to those of the elongate member control mechanism 1772. A third magnetic connector 2794 is connected to the housing 2704 near the first lateral side 2730. A fourth magnetic connector 2796 is connected to the housing 2704 near the second lateral side 2734. The first magnetic connector 2790, the second magnetic connector 2792, the third magnetic connector 2794, and the fourth magnetic connector 2796 may include features similar to those of any other described magnetic connector.

The first magnetic connector 2790 and the second magnetic connector 2792 may be movable between a connected position and a disconnected position. In the disconnected position shown in FIG. 27, the first elongate member 2706a is retracted into the interior space 2724 near the first lateral side 2730, and the second elongate member 2706b is retracted into the interior space 2724 near the second lateral side 2734. The first magnetic connector 2790 is connected to the third magnetic connector 2794 for storage of the first elongate member 2706a. The second magnetic connector 2792 is connected to the fourth magnetic connector 2796 for storage of the second elongate member 2706b. In the disconnected position, the first elongate member 2706a and the second elongate member 2706b are not extended around the user's head, and the housing 2704 is released with respect to the head of the user. In the connected position shown in FIG. 28, the first elongate member 2706a is extended from the interior space 2724 near the first lateral side 2730, and the second elongate member 2706b is extended from the interior space 2724 near the second lateral side 2734. The first magnetic connector 2790 is connected to the second magnetic connector 2792. In the connected position, the first elongate member 2706a and the second elongate member 2706b may be extended around the user's head, and the housing 2704 may be secured relative to the user's head.

In some embodiments, the first elongate member 2706a may be connected to the housing 2704 by a first spring-loaded spool, and the second elongate member 2706b may be connected to the housing 2704 by a second spring-loaded spool as described.

In some embodiments, the first elongate member 2706a may be connected to the housing 2704 by a first motorized spool, and the second elongate member 2706b may be connected to the housing 2704 by a second motorized spool as described.

Figure 29:
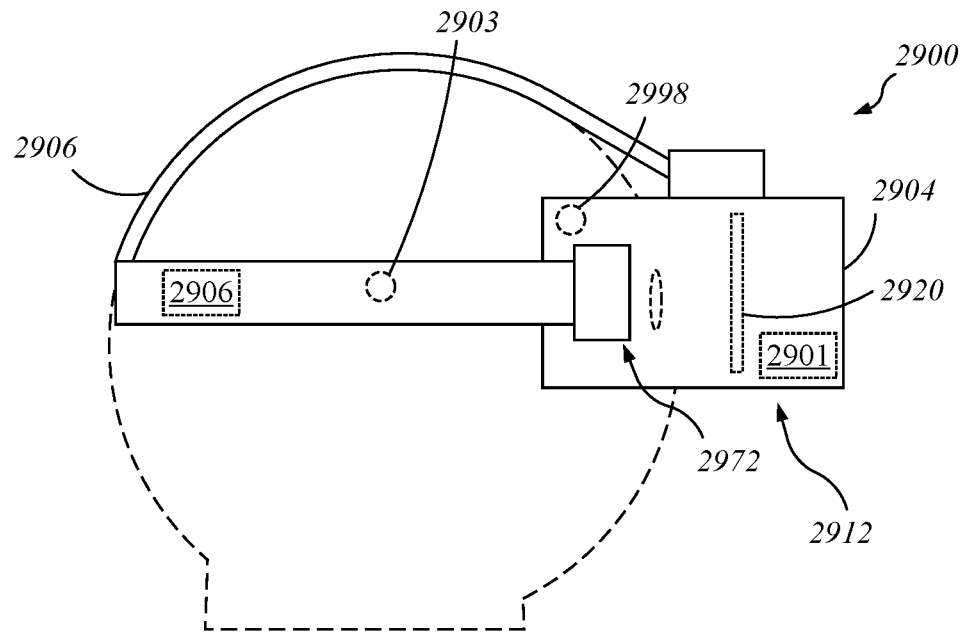
FIG. 29 is a side view of a head mounted device according to a nineteenth example in a first position.
Figure 30:
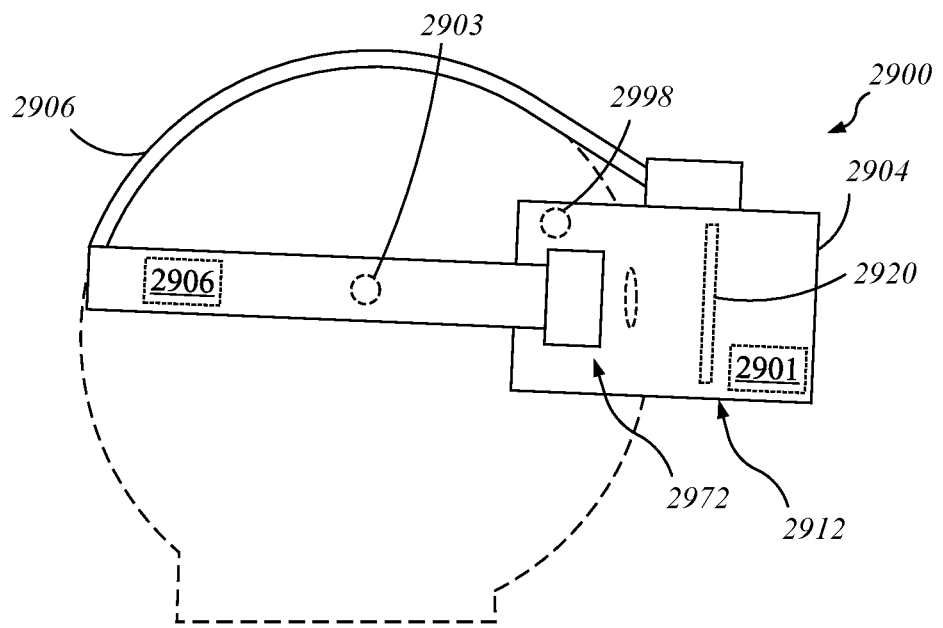
FIG. 30 is a side view of the head mounted device according to the nineteenth example in a second position.

FIG. 29 is a side view of a head mounted device 2900 according to a nineteenth example in a first position. FIG. 30 is a side view of the head mounted device 2900 according to the nineteenth example in a second position. The head mounted device 2900 may include features similar to those of any head mounted device previously described. While being worn by the user, the head mounted device 2900 may slip from a first position (shown in FIG. 29), which may be referred to as an original position, to a second position (shown in FIG. 30). A change in position of the head mounted device 2900 may result in poor image quality and user discomfort.

In the illustrated example, the head mounted device 2900 includes a housing 2904 and an elongate member 2906 connected to the housing 2904. The elongate member 2906 is extended around the head of the user such that the housing 2904 is secured relative to the user's head. The housing 2904 defines a display enclosure 2901. The display enclosure 2901 is a space defined by the housing 2904 between the eyes of the user and a display 2920 through which the user views the content.

The head mounted device 2900 includes an elongate member control mechanism 2972 coupled to the housing 2904 and to the elongate member 2906. The elongate member control mechanism 2972 may include features similar to those of the elongate member control mechanism 1772. The elongate member control mechanism 2972 extends and retracts the elongate member 2906 into and out of the housing 2904 to move the display enclosure 2901 relative to the user's head. In some embodiments, a controller 2912 may use the elongate member control mechanism 2972 to move the head mounted device 2900 between the first position and the second position. The controller 2912 may include features similar to those of the controller 212.

The head mounted device 2900 includes a first motion sensing device 2998 that detects movement of the display enclosure 2901. The first motion sensing device 2998 may be included in the sensors 210. The first motion sensing device 2998 may include an inertial measurement unit, magnetometer, accelerometer, gyroscope, or any other suitable motion sensor. The first motion sensing device 2998 is connected to the housing 2904. The first motion sensing device 2998 may be coupled to the housing 2904 in the display enclosure 2901 or in any other location on the housing 2904.

The head mounted device 2900 includes a second motion sensing device 2903 that detects motion of the elongate member 2906. The second motion sensing device 2903 may include features similar to those of the first motion sensing device 2998. The second motion sensing device 2903 is connected to the elongate member 2906. The first motion sensing device 2998 and the second motion sensing device 2903 may send respective signals to the controller 2912 indicative of the motion of the display enclosure 2901 and the elongate member 2906.

Figure 31:
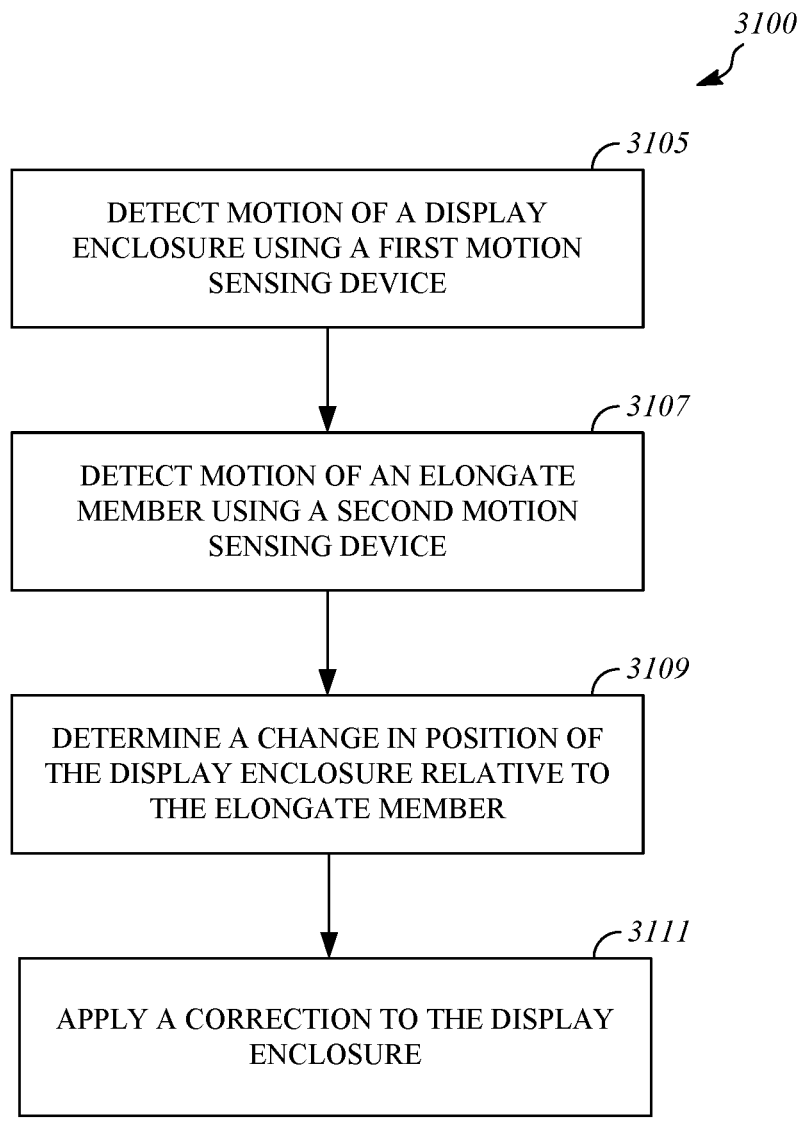
FIG. 31 is a flowchart showing a method for correcting an orientation of the head mounted device according to the nineteenth example.

FIG. 31 is a flowchart showing a process 3100 for correcting an orientation of the head mounted device 2900 according to the nineteenth example. In operation 3105, the first motion sensing device 2998 detects motion of the display enclosure 2901.

In operation 3107, the second motion sensing device 2903 detects motion of the elongate member 2906.

In operation 3109, the controller 2912 determines a change in position of the display enclosure 2901 relative to the elongate member 2906 based on the detected motion of the display enclosure 2901 and the detected motion of the elongate member 2906. If the controller 2912 does not determine a change in position of the display enclosure 2901 relative to the elongate member 2906, the controller 2912 may return to operation 3105.

In operation 3111, in response to a determination that the position of the display enclosure 2901 has changed relative to the elongate member 2906, the controller 2912 applies a correction to the display enclosure 2901. In some embodiments, the controller 2912 may iteratively repeat any of the described operations.

In some embodiments, applying the correction to the display enclosure 2901 in operation 3111 may include activating the elongate member control mechanism 2972 coupled to the elongate member 2906 to move the display enclosure 2901 to the first position. The controller 2912 may use the elongate member control mechanism 2972 to retract a portion of the elongate member 2906 into the housing 2904 to move the head mounted device 2900 from the second position to the first position.

In some embodiments, applying the correction to the display enclosure 2901 in operation 3111 may include applying software image correction to a display 2920. The display 2920 may include features similar to those of the display 220. If the content viewed by the user is distorted by movement of the head mounted device 2900, the controller 2912 may re-render the content using the display 2920 to align the user's new field of view with the content such that the image viewed by the user is no longer distorted.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to allow the head mounted devices described herein to accommodate users having varying head sizes. The present disclosure contemplates that in some instances, this gathered data may include personal information data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to create a user identity profile that is associated with a user's preferred head mounted device settings. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of such data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to such entities' privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, the collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, their personal information data. That is, the present disclosure contemplates that hardware and/or software elements can be provided to prevent or block access to such personal information data. For example, in the case of head mounted devices, the present technology can be configured to allow users to select to "opt in" or "opt out" of participation in the collection of personal information data during registration for services or anytime thereafter. In another example, users can opt out of providing (i.e., choose not to provide) their preferred head mounted device settings for adjustment of the head mounted device. In yet another example, users can opt to limit the length of time that their preferred settings are maintained or entirely prohibit the development of preferred settings. In addition to providing "opt in" and "opt out" options, the present disclosure contemplates providing notifications relating to the access or use of personal information. For instance, users may be notified upon downloading an app that their personal information data will be accessed and then reminded again just before their personal information data is accessed by the app.

Moreover, it is the intent of the present disclosure that personal information data should be managed and handled in such a manner as to minimize the risk of unintentional or unauthorized access to or use of such personal information data. Such risk can be minimized by limiting the collection of data and deleting data once it is no longer needed. In addition, and when applicable, including in certain health-related applications, data de-identification can be used to protect users' privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers the use of personal information data to implement one or more of the various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the head mounted devices described herein may be adjusted manually or adjusted based on non-personal information data or a bare minimum amount of personal information, such as the content being requested by the device associated with a user, other non-personal information available to the head mounted device, or publicly available information.

While the disclosure includes certain embodiments, the disclosure is not to be limited to the described embodiments but is intended to cover modifications and equivalent configurations included within the scope of the appended claims. The scope of the appended claims is to be accorded the broadest interpretation as is permitted under the law so as to encompass all such modifications and equivalent configurations.

What is claimed is:

1. A head mounted device, comprising:
   a housing;
   lenses connected to the housing; and
   a lens cover that is connected to the housing and is movable between a connected position and a disconnected position with respect to the housing; and
   an elongate member that is configured to be disposed around a head of a user to support the housing relative to the head of the user, wherein the lens cover is connected to the elongate member.

2. The head mounted device of claim 1, wherein the lens cover includes at least one connector that is configured to removably connect the lens cover to the housing.

3. The head mounted device of claim 2, wherein the at least one connector is connectable to the housing at a periphery of one of the lenses.

4. The head mounted device of claim 2, wherein the at least one connector is located on a periphery of the lens cover.

5. The head mounted device of claim 2, wherein the at least one connector is a magnet.

6. The head mounted device of claim 1, wherein the lens cover is configured to cover the lenses when the lens cover is in the connected position.

7. A head mounted device, comprising:
   a housing;
   lenses connected to the housing; and
   a lens cover that is connected to the housing and is movable between a connected position and a disconnected position with respect to the housing, wherein the lens cover is connected to the housing by a first cord that extends from a first lateral side of the housing to the lens cover, and by a second cord that extends from a second lateral side of the housing to the lens cover.

8. The head mounted device of claim 7, wherein the first cord is connected to the housing at a first attachment point that is disposed in an interior space of the housing, and the second cord is connected to the housing at a second attachment point that is disposed in the interior space of the housing.

9. A head mounted device, comprising:
   a housing;
   lenses connected to the housing; and
   a lens cover that is connected to the housing and is movable between a connected position and a disconnected position with respect to the housing, wherein the lens cover is configured to contact a back portion of a head of a user in the disconnected position.

10. The head mounted device of claim 9, wherein the lens cover includes at least one connector that is configured to removably connect the lens cover to the housing.

11. The head mounted device of claim 10, wherein the at least one connector is connectable to the housing at a periphery of one of the lenses.

12. The head mounted device of claim 10, wherein the at least one connector is a magnet.

13. The head mounted device of claim 9, further comprising:
   a headband, wherein the lens cover is connected to the headband.

14. A head mounted device, comprising:
   a housing;
   a headband;
   lenses connected to the housing; and
   a lens cover that is connected to the headband and is magnetically connectable to the housing.

15. The head mounted device of claim 14, wherein the lens cover includes at least one magnet for magnetically connecting the lens cover to the housing.

16. The head mounted device of claim 15, wherein the at least one magnet is connectable to the housing at a periphery of one of the lenses.

17. The head mounted device of claim 14, wherein the lens cover is configured to contact a back portion of a head of a user.

18. The head mounted device of claim 14, further comprising:
   a display that is configured to emit light corresponding to content for display to a user using the lenses.

19. A head mounted device, comprising:
   a housing that defines an interior space;
   an elongate member control mechanism coupled to the interior space of the housing;

an elongate member coupled to the elongate member control mechanism and configured to extend circumferentially around a head of a user, wherein the elongate member control mechanism is operable to extend and retract the elongate member; and lenses coupled to the housing, wherein:

the elongate member includes a lens cover having at least one connector configured to removably connect to the housing, and the lens cover is moveable relative to the housing between a connected position and a disconnected position.

20. The head mounted device of claim 19, wherein the lens cover is configured to contact a back portion of the head of the user in the disconnected position.

* * * * *